(12) United States Patent  
Chait et al.

(10) Patent No.: US 8,871,287 B2  
(45) Date of Patent: Oct. 28, 2014

(54) CONTAINER FOR EGGS, METHOD AND APPARATUS FOR ARRANGING AND STABILIZING EGGS IN A CONTAINER

(75) Inventors: Mitchell Barry Chait, Las Vegas, NV (US); Richard Blackburn, Tustin, CA (US); Marco Armand Hegyi, Laguna Niguel, CA (US)

(73) Assignee: TEN Media, LLC, Beverly Hills, CA (US)

( * ) Notice: Subject to any disclaimer, the term of this patent is extended or adjusted under 35 U.S.C. 154(b) by 0 days.

(21) Appl. No.: 13/401,241

(22) Filed: Feb. 21, 2012

(65) Prior Publication Data

US 2012/0180436 A1 Jul. 19, 2012

Related U.S. Application Data

(63) Continuation-in-part of application No. PCT/US2011/021680, filed on Jan. 19, 2011, which is a continuation-in-part of application No. 12/690,859, filed on Jan. 20, 2010, now Pat. No. 8,455,030, and a continuation-in-part of application No. 12/690,872, (Continued)

(51) Int. Cl.
*A23B 5/00* (2006.01)
*A23L 1/32* (2006.01)

(52) U.S. Cl.
CPC ........................................ *A23L 1/32* (2013.01)
USPC ........... 426/298; 426/392; 426/614; 426/119; 119/50.7; 53/446; 206/521.1

(58) Field of Classification Search
USPC ........... 426/87, 383, 106, 119, 298, 234, 248, 426/237; 119/50.7, 6.8, 322, 323; 101/35, 101/38.1–40.1; 219/121.69, 212.68; 53/446, 443; 206/521, 521.1, 521.3, 206/521.5, 521.6, 521.7, 521.8
See application file for complete search history.

(56) References Cited

U.S. PATENT DOCUMENTS 1,796,872 A 3/1931 Markey et al.
1,906,094 A 4/1933 Powell
(Continued)

FOREIGN PATENT DOCUMENTS

CA 665 927 A 7/1963
DE 3601913 7/1987
(Continued)

OTHER PUBLICATIONS

Examiner's report No. 2 on patent application No. AU2005294770 mailed on May 24, 2012.

(Continued)

*Primary Examiner* — Drew Becker
*Assistant Examiner* — Luana Z Long
(74) *Attorney, Agent, or Firm* — Wolf, Greenfield & Sacks, P.C.

(57) ABSTRACT

A method for arranging eggs in a container. Eggs placed in receptacles of the container come to a resting orientation, by virtue of eh contouring of the receptacle, such that a long axis of the first egg is tilted toward a rear portion of the container at nearly uniform angles slightly offset from a vertical axis, and parallel side-to-side. Using features of the container, movement of eggs from their resting orientation, as well as twisting (spinning) about their long axes is resisted during marking, shipping or handling. The orienting of eggs in the receptacles or compartments thereof may be aided by use of an egg orienter. Tilting of the eggs may be facilitated by using receptacles or compartments which are asymmetrically contoured with respect to the vertical axis.

22 Claims, 25 Drawing Sheets

Related U.S. Application Data filed on Jan. 20, 2010, now Pat. No. 8,657,098, and a continuation-in-part of application No. 12/690,876, filed on Jan. 20, 2010, now Pat. No. 8,499,718, and a continuation-in-part of application No. 12/690,886, filed on Jan. 20, 2010, now Pat. No. 8,715,757, and a continuation-in-part of application No. 12/690,890, filed on Jan. 20, 2010, now Pat. No. 8,455,026, and a continuation-in-part of application No. 12/690,896, filed on Jan. 20, 2010, and a continuation-in-part of application No. 12/690,898, filed on Jan. 20, 2010, application No. 13/401,241, which is a continuation-in-part of application No. 12/690,859, filed on Jan. 20, 2010, now Pat. No. 8,455,030, and a continuation-in-part of application No. 12/690,872, filed on Jan. 20, 2010, now Pat. No. 8,657,098, and a continuation-in-part of application No. 12/690,876, filed on Jan. 20, 2010, now Pat. No. 8,499,718, and a continuation-in-part of application No. 12/690,886, filed on Jan. 20, 2010, now Pat. No. 8,715,757, and a continuation-in-part of application No. 12/690,890, filed on Jan. 20, 2010, now Pat. No. 8,455,026, and a continuation-in-part of application No. 12/690,896, filed on Jan. 20, 2010, and a continuation-in-part of application No. 12/690,898, filed on Jan. 20, 2010.

(60) Provisional application No. 61/296,837, filed on Jan. 20, 2010.

(56) References Cited

U.S. PATENT DOCUMENTS

| | | | | |
|---|---|---|---|---|
| 2,039,486 | A | | 5/1936 | Lincoln |
| 2,061,065 | A | | 11/1936 | De Reamer |
| 2,080,122 | A | * | 5/1937 | Ford et al. ............. 206/521.4 |
| 2,843,026 | A | | 7/1958 | Burger |
| 2,843,304 | A | | 7/1958 | Reifers |
| 3,094,920 | A | | 6/1963 | Priesmeyer |
| 3,242,008 | A | | 3/1966 | Kurtz |
| 3,244,349 | A | | 4/1966 | Randles, Jr. |
| 3,392,414 | A | | 7/1968 | Cathcart et al. |
| 3,501,083 | A | | 3/1970 | Lake |
| 3,548,435 | A | | 12/1970 | Comber et al. |
| 3,556,387 | A | | 1/1971 | Trimble |
| 3,567,107 | A | | 3/1971 | Artz |
| 3,595,164 | A | | 7/1971 | Hovekamp |
| 3,598,300 | A | | 8/1971 | Katz |
| 3,625,413 | A | | 12/1971 | Medendorp |
| 3,661,320 | A | | 5/1972 | Donaldson |
| 3,670,952 | A | | 6/1972 | Venuti et al. |
| 3,712,532 | A | | 1/1973 | Alroy |
| 3,730,420 | A | | 5/1973 | Burkett |
| 3,767,103 | A | | 10/1973 | Reifers |
| 3,779,159 | A | | 12/1973 | Rose et al. |
| 3,817,441 | A | | 6/1974 | Jackson |
| 3,848,730 | A | | 11/1974 | Niederer et al. |
| 3,916,143 | A | | 10/1975 | Farrell |
| 3,917,152 | A | | 11/1975 | Burkett |
| 3,950,208 | A | | 4/1976 | Pavuk et al. |
| 4,043,105 | A | | 8/1977 | Cochran |
| 4,081,123 | A | | 3/1978 | Reifers |
| 4,189,898 | A | | 2/1980 | Moulds et al. |
| 4,195,736 | A | | 4/1980 | Loeffler |
| 4,240,575 | A | | 12/1980 | Tange |
| 4,382,536 | A | | 5/1983 | Congleton |
| 4,394,214 | A | | 7/1983 | Bixler et al. |
| 4,419,068 | A | | 12/1983 | Congleton |
| 4,448,344 | A | | 5/1984 | Lord et al. |
| 4,480,781 | A | | 11/1984 | Emery et al. |
| 4,505,373 | A | | 3/1985 | Thomas |
| 4,519,494 | A | | 5/1985 | McEvoy et al. |
| 4,519,505 | A | | 5/1985 | Thomas |
| 4,569,444 | A | | 2/1986 | McEvoy et al. |
| 4,575,993 | A | * | 3/1986 | Meyn ............................. 53/534 |
| 4,578,329 | A | | 3/1986 | Holsappel |
| 4,636,043 | A | | 1/1987 | Bellar |
| 4,652,722 | A | | 3/1987 | Stone et al. |
| 4,720,618 | A | | 1/1988 | Stamer et al. |
| 4,727,235 | A | | 2/1988 | Stamer et al. |
| 4,750,316 | A | | 6/1988 | Bliss |
| 4,795,080 | A | | 1/1989 | McIntyre |
| 4,839,181 | A | | 6/1989 | MacMurray |
| 4,843,958 | A | | 7/1989 | Egosi |
| 4,872,608 | A | | 10/1989 | Lake |
| 4,900,617 | A | | 2/1990 | Smith |
| 5,021,631 | A | | 6/1991 | Revellat |
| 5,102,034 | A | | 4/1992 | Amabili |
| 5,120,631 | A | | 6/1992 | Kanbayashi et al. |
| 5,120,928 | A | | 6/1992 | Piliero |
| 5,142,976 | A | | 9/1992 | Roulleau |
| 5,164,009 | A | | 11/1992 | Chandler |
| 5,198,843 | A | | 3/1993 | Ito |
| 5,316,119 | A | | 5/1994 | Robertson |
| 5,321,491 | A | | 6/1994 | Summers et al. |
| 5,335,003 | A | | 8/1994 | Sugden |
| 5,477,179 | A | | 12/1995 | Takada et al. |
| 5,478,990 | A | | 12/1995 | Montanari et al. |
| 5,494,164 | A | | 2/1996 | Ramirez |
| 5,526,119 | A | | 6/1996 | Blit et al. |
| 5,608,429 | A | | 3/1997 | Hayashihara et al. |
| 5,653,900 | A | | 8/1997 | Clement et al. |
| 5,660,747 | A | | 8/1997 | Drouillard et al. |
| 5,691,757 | A | | 11/1997 | Hayashihara et al. |
| 5,767,477 | A | | 6/1998 | Sutter, Jr. |
| 5,792,807 | A | | 8/1998 | Hayashihara et al. |
| 5,798,843 | A | | 8/1998 | Yamamoto et al. |
| 5,835,911 | A | | 11/1998 | Nakagawa et al. |
| 5,897,797 | A | | 4/1999 | Drouillard et al. |
| 5,928,842 | A | | 7/1999 | Shinmoto et al. |
| 6,029,424 | A | | 2/2000 | McEvoy et al. |
| 6,056,341 | A | | 5/2000 | Bliss |
| 6,154,738 | A | | 11/2000 | Call |
| 6,180,914 | B1 | | 1/2001 | Jones et al. |
| 6,421,159 | B1 | | 7/2002 | Sutter et al. |
| 6,429,829 | B1 | | 8/2002 | Murokh |
| 6,584,982 | B1 | | 7/2003 | Clay et al. |
| 6,678,094 | B2 | | 1/2004 | Sator |
| 6,732,928 | B1 | | 5/2004 | Lawlor |
| 6,791,592 | B2 | | 9/2004 | Assa et al. |
| 6,796,241 | B2 | | 9/2004 | Catalan et al. |
| 6,810,796 | B2 | | 11/2004 | Catalan et al. |
| 6,829,000 | B2 | | 12/2004 | Assa et al. |
| D525,535 | S | | 7/2006 | Rathbone |
| 7,255,231 | B2 | | 8/2007 | Andrews et al. |
| 7,258,234 | B2 | | 8/2007 | Aardema et al. |
| 7,353,951 | B2 | | 4/2008 | Vovan |
| 7,951,409 | B2 | | 5/2011 | Parker |
| 8,084,712 | B2 | | 12/2011 | Griffiths et al. |
| 8,148,259 | B2 | | 4/2012 | Arai et al. |
| 8,455,026 | B2 | | 6/2013 | Chait et al. |
| 8,455,030 | B2 | | 6/2013 | Chait et al. |
| 8,499,718 | B2 | | 8/2013 | Chait et al. |
| 8,544,739 | B2 | | 10/2013 | Parker |
| 2001/0030179 | A1 | | 10/2001 | Knieb et al. |
| 2002/0011311 | A1 | | 1/2002 | Carignan et al. |
| 2002/0179580 | A1 | | 12/2002 | Costin |
| 2003/0080191 | A1 | | 5/2003 | Lubow et al. |
| 2003/0200300 | A1 | | 10/2003 | Melchione |
| 2003/0206227 | A1 | | 11/2003 | Assa et al. |
| 2003/0226835 | A1 | | 12/2003 | Bell et al. |
| 2004/0088348 | A1 | | 5/2004 | Yeager et al. |
| 2004/0130612 | A1 | | 7/2004 | Assa et al. |
| 2004/0220855 | A1 | | 11/2004 | Carignan et al. |
| 2005/0226975 | A1 | | 10/2005 | Drouillard |
| 2006/0012821 | A1 | | 1/2006 | Franklin et al. |
| 2006/0087686 | A1 | | 4/2006 | Anderson |
| 2006/0138105 | A1 | | 6/2006 | Parker et al. |
| 2006/0251769 | A1 | | 11/2006 | Rathbone |
| 2007/0108092 | A1 | | 5/2007 | Minuto et al. |
| 2008/0223834 | A1 | | 9/2008 | Griffiths et al. |
| 2008/0279991 | A1 | | 11/2008 | Kwon |

(56) References Cited

U.S. PATENT DOCUMENTS

| | | |
|---|---|---|
| 2009/0020395 A1 | 1/2009 | Accettura |
| 2011/0174223 A1 | 7/2011 | Chait et al. |
| 2011/0175974 A1 | 7/2011 | Chait et al. |
| 2011/0176901 A1 | 7/2011 | Chait et al. |
| 2011/0177206 A1 | 7/2011 | Chait et al. |
| 2011/0177207 A1 | 7/2011 | Chait et al. |
| 2011/0177208 A1 | 7/2011 | Chait et al. |
| 2011/0177217 A1 | 7/2011 | Chait et al. |
| 2011/0258171 A1 | 10/2011 | Parker |
| 2012/0114820 A1 | 5/2012 | Griffiths et al. |
| 2013/0017296 A1 | 1/2013 | Chait et al. |
| 2013/0212981 A1 | 8/2013 | Chait et al. |

FOREIGN PATENT DOCUMENTS

| | | |
|---|---|---|
| DE | 3722176 | 1/1989 |
| DE | 3836821 | 5/1990 |
| DE | 247831 | 4/1991 |
| DE | 291471 A5 | 4/1991 |
| DE | 4125007 | 1/1993 |
| DE | 4322252 | 1/1995 |
| DE | 010109109 | 10/2001 |
| EP | 0 160 741 A2 | 11/1985 |
| EP | 0421837 | 4/1991 |
| EP | 0684144 | 11/1995 |
| EP | 0908313 A2 | 4/1999 |
| EP | 2 319 653 A1 | 5/2011 |
| ES | 2033185 | 3/1993 |
| FR | 2 589 448 A1 | 5/1987 |
| FR | 2654662 | 5/1991 |
| FR | 2621529 | 4/1999 |
| GB | 2131767 A | 6/1984 |
| JP | 55034966 | 3/1980 |
| JP | 58-090985 | 5/1983 |
| JP | 61206692 | 9/1986 |
| JP | 1108940 | 4/1989 |
| JP | 1196259 | 8/1989 |
| JP | 2060552 | 3/1990 |
| JP | 3211068 | 9/1991 |
| JP | 5146887 A2 | 6/1993 |
| JP | 7011183 | 1/1995 |
| JP | 2000168157 | 6/2000 |
| JP | 2001136859 | 5/2001 |
| WO | WO 01/15678 A2 | 3/2001 |
| WO | WO 01/56789 | 8/2001 |
| WO | WO 2004/064530 A2 | 8/2004 |
| WO | WO 2004/086166 A2 | 10/2004 |
| WO | WO 2007/087116 A2 | 8/2007 |
| WO | WO 2008/115367 A2 | 9/2008 |
| WO | WO 2011/091011 A1 | 7/2011 |

OTHER PUBLICATIONS

Durand-Wayland Labeling Systems, http://www.durand-wayland.com/label/8/7/2006.

European Search Report from related application PCT/US 08/03160, mailed Aug. 12, 2008.

Horenstein, How Lasers Could Print Ads on Food, Daily Mail, Mar. 4, 1999.

International Preliminary Examination Report of Application PCT/US2011/021680 mailed on Feb. 20, 2012.

International Preliminary Examination Report of Application PCT/US2011/021680 mailed on Jul. 25, 2012.

International Search Report and Written Opinion for International Application No. PCT/US2011/021680 mailed Jul. 12, 2011.

International Search Report for International Application No. PCT/US2011/021680, mailed May 11, 2011 (2 pages).

Stiles, Laser Labeling, Mail Tribune Sep. 19, 2004.

Written Opinion of the International Preliminary Examining Authority of Application PCT/US2011/021680 mailed on May 29, 2012.

International Search Report and Written Opinion for International Application No. PCT/US2013/026888, mailed May 23, 2013.

* cited by examiner

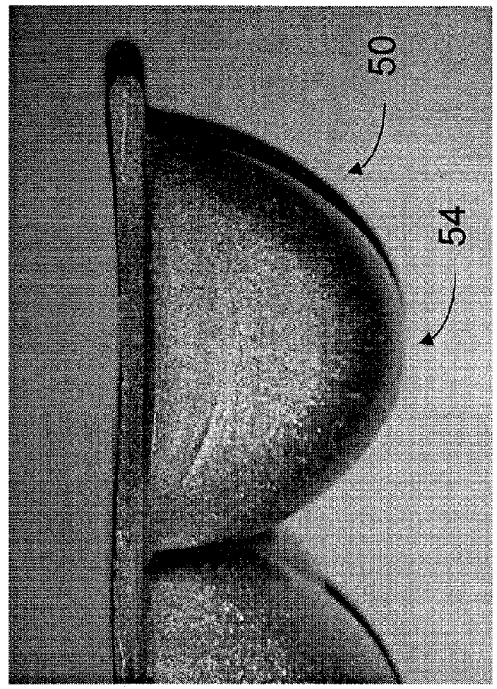
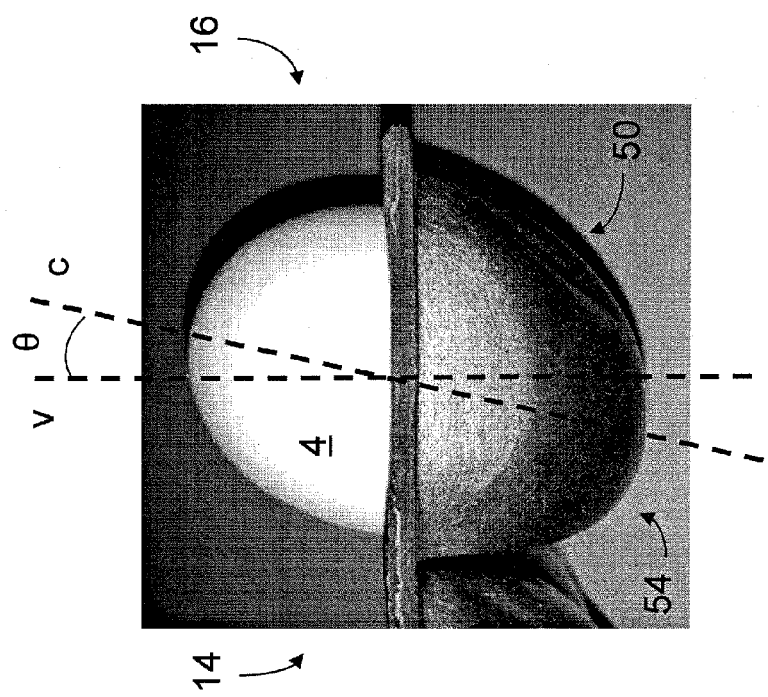
Fig. 3A
Fig. 3B

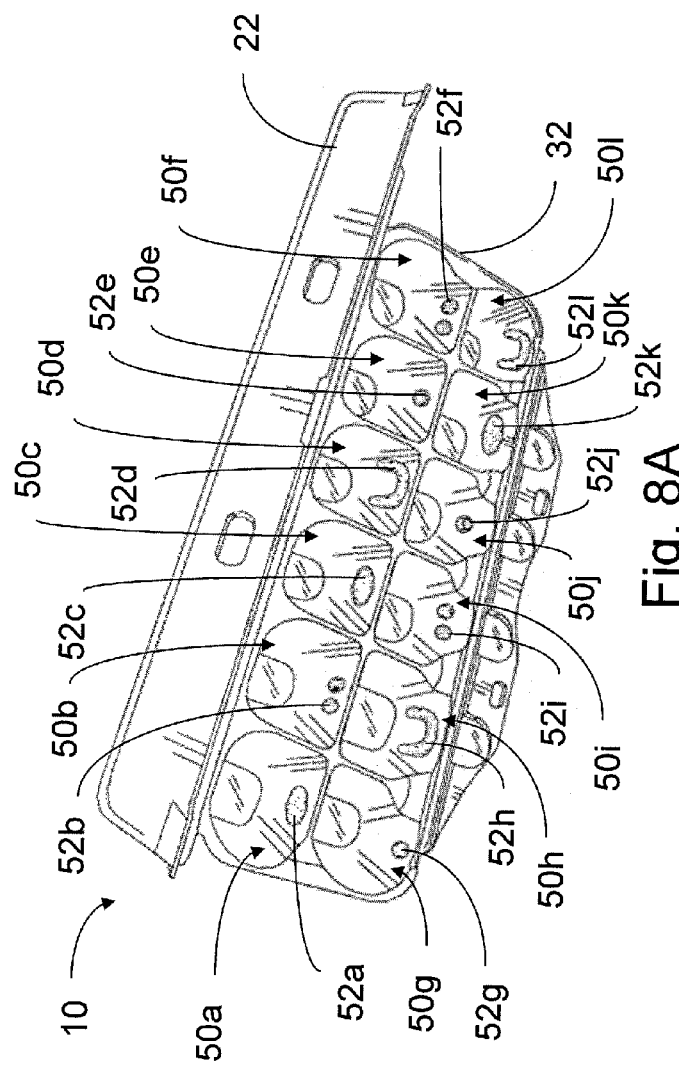
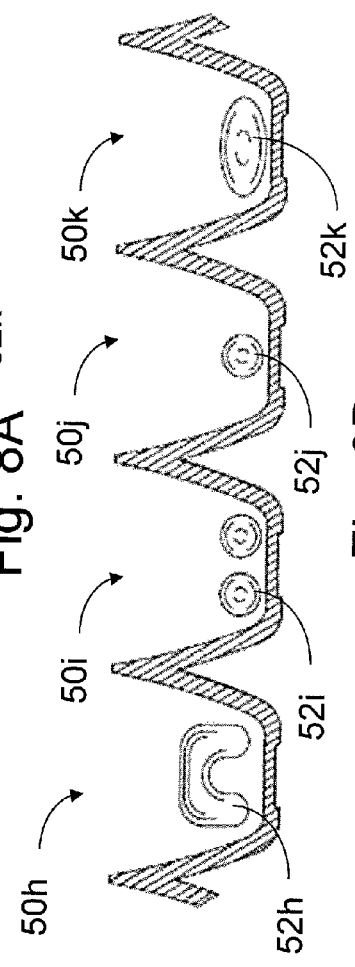
Fig. 8A
Fig. 8B

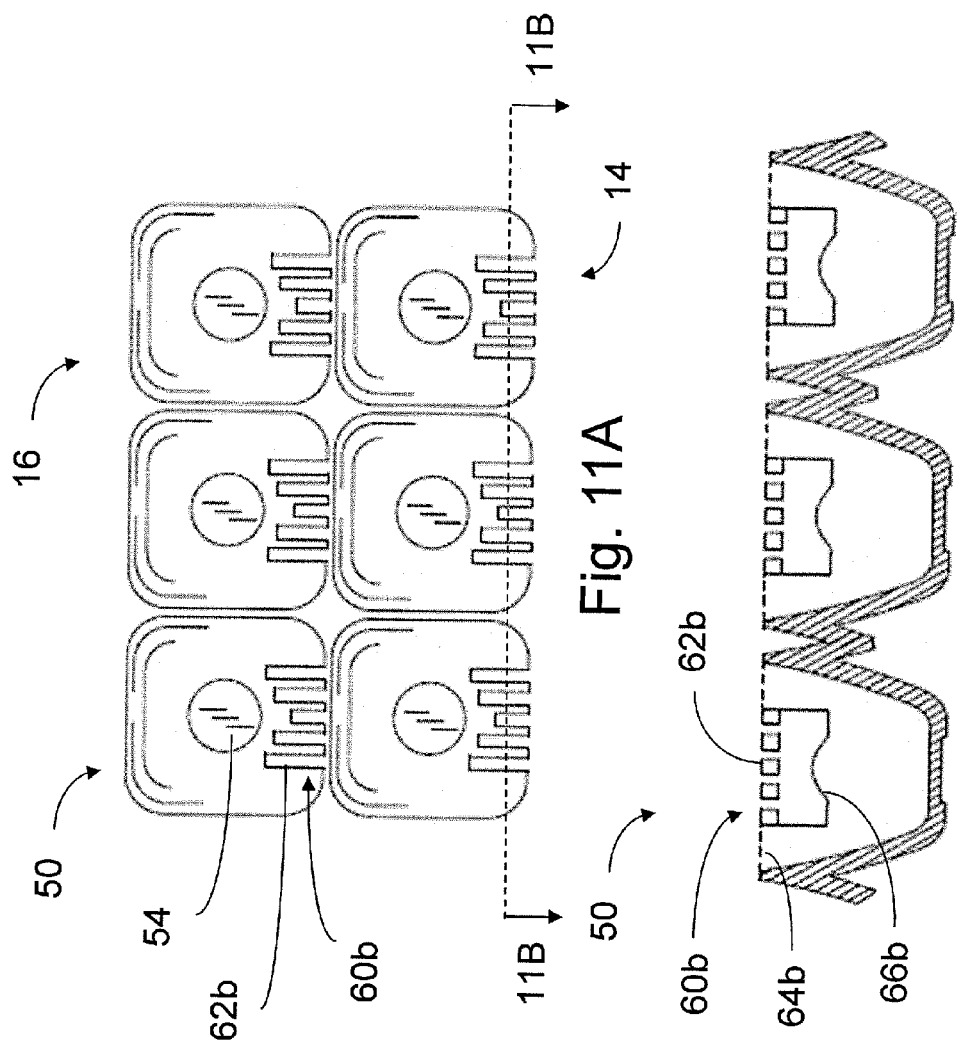

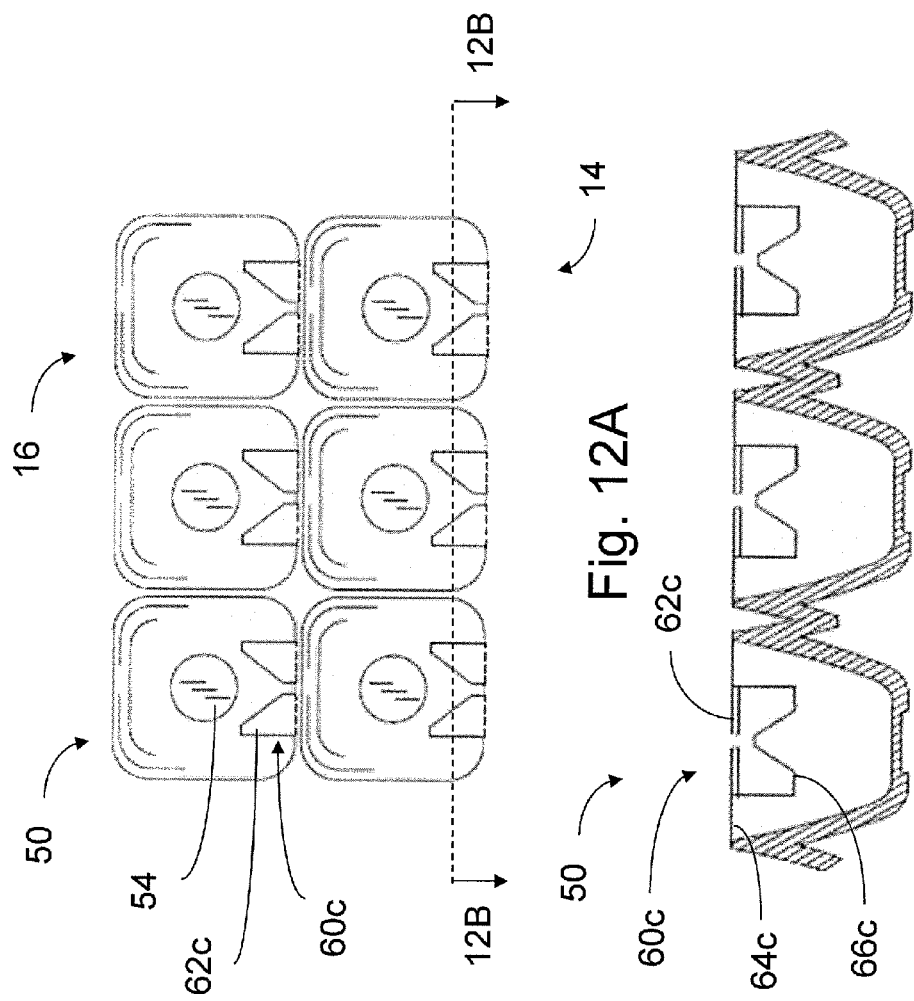

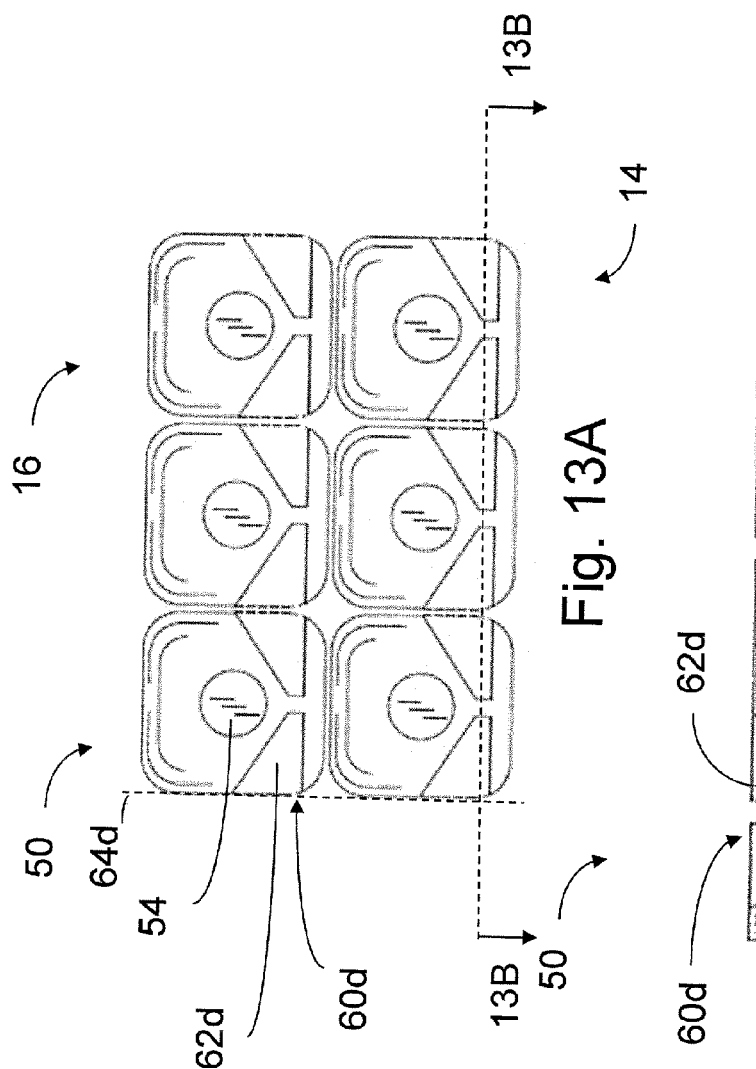
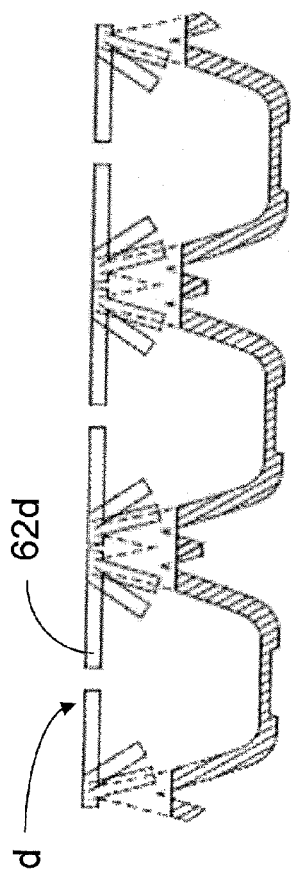
Fig. 13A
Fig. 13B

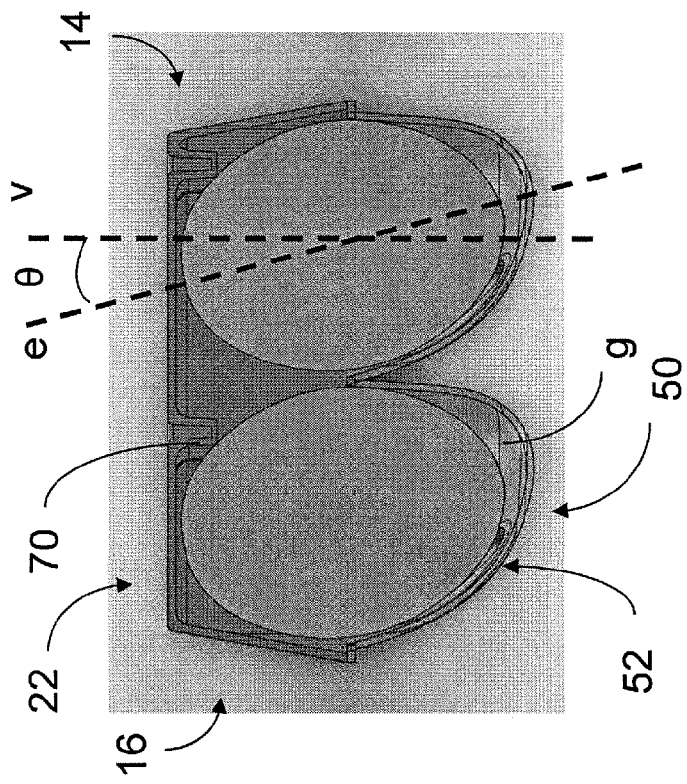
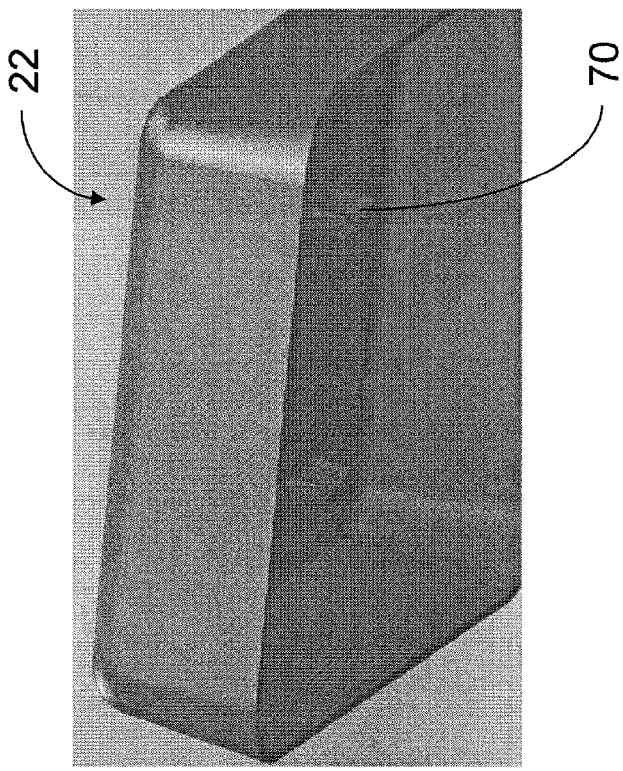
Fig. 14B
Fig. 14A

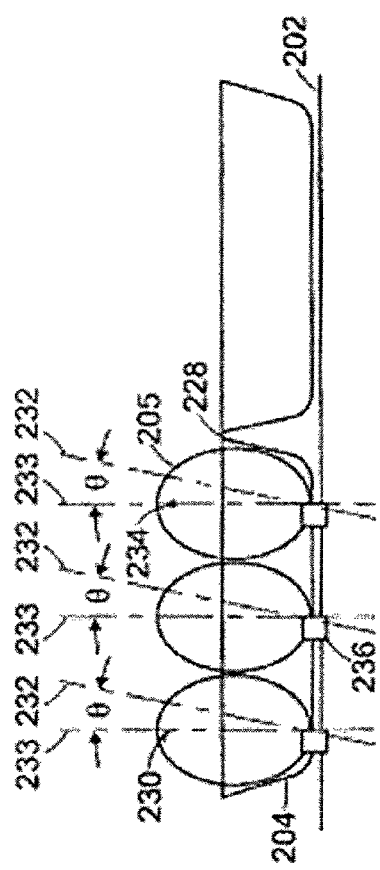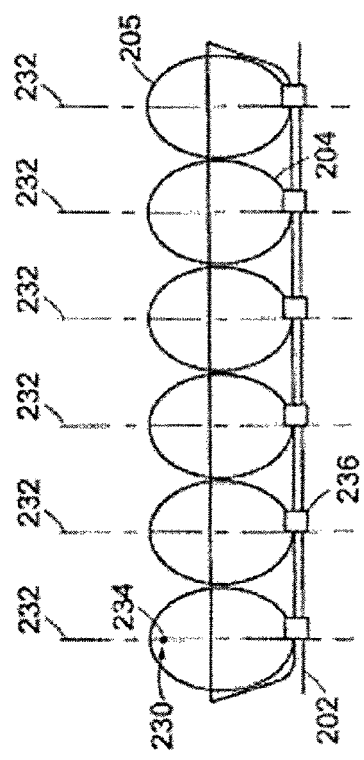
Fig. 17A
Fig. 17B

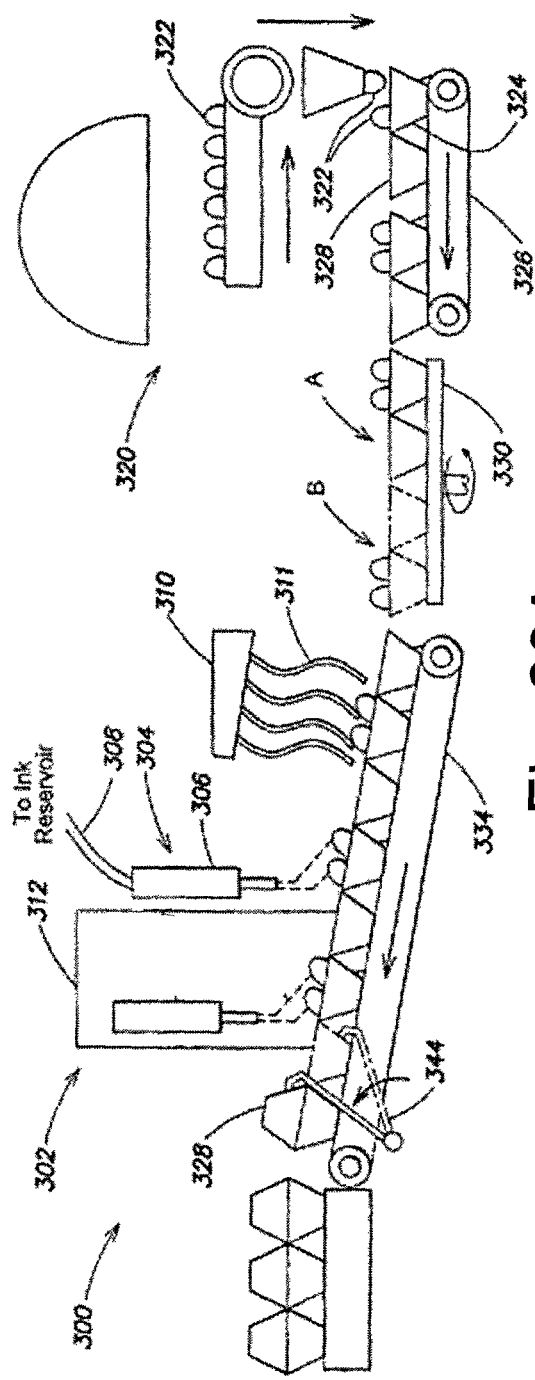
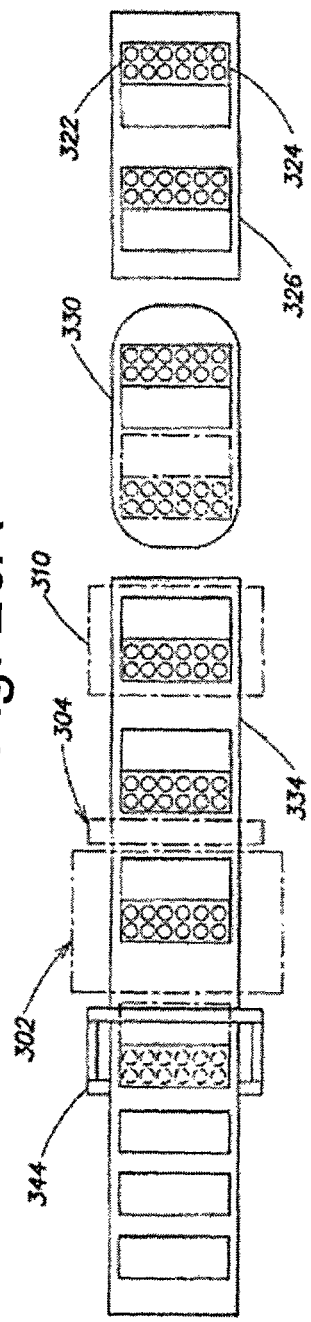
Fig. 20A
Fig. 20B

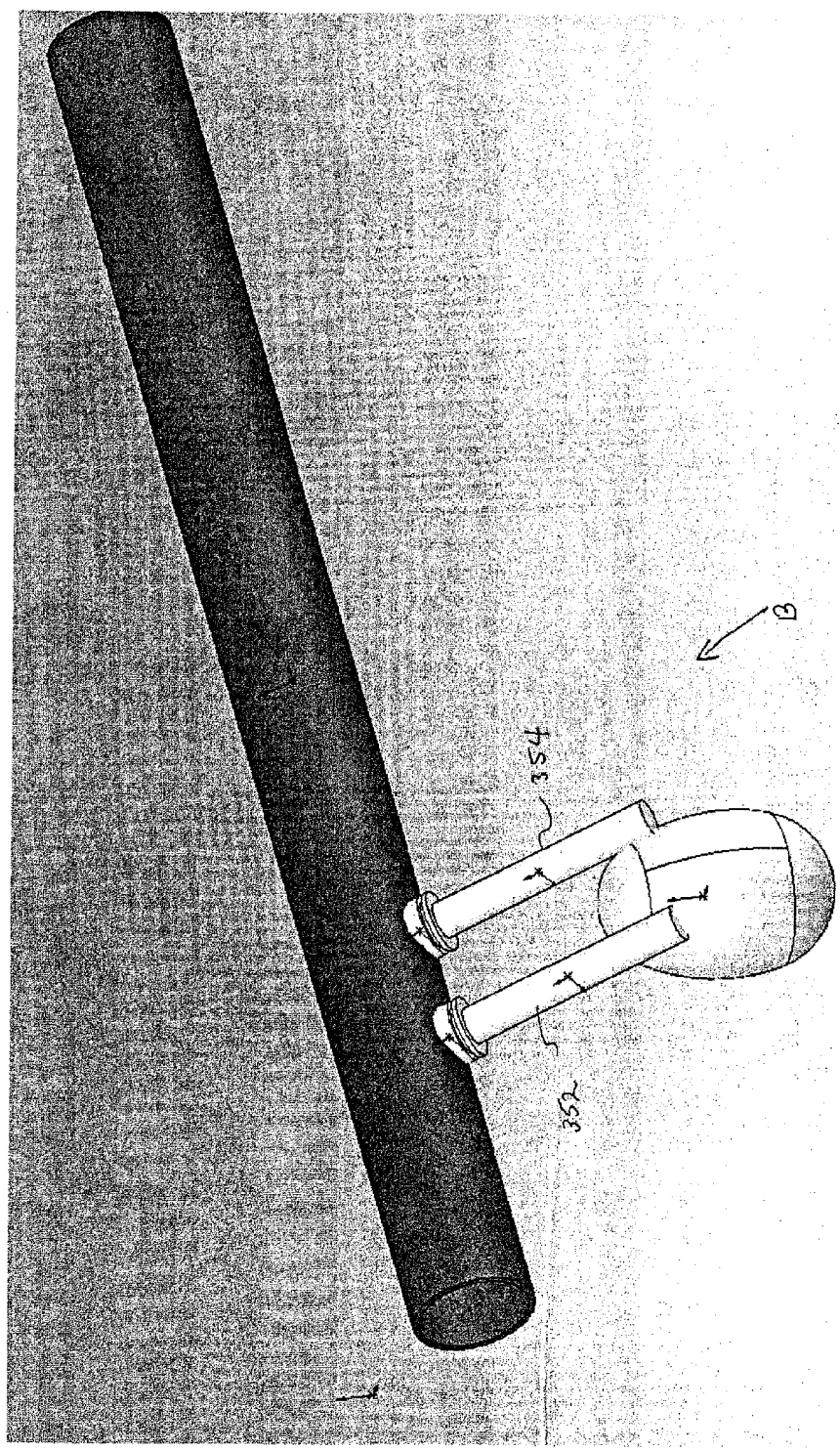

CONTAINER FOR EGGS, METHOD AND APPARATUS FOR ARRANGING AND STABILIZING EGGS IN A CONTAINER

CROSS-REFERENCE TO RELATED APPLICATIONS

This application is a continuation-in-part of the following U.S. patent application Ser. Nos. 12/690,859, 12/690,872, 12/690,876, 12/690,886, 12/690,890, 12/690,896, and 12/690,898, all filed Jan. 20, 2010, each titled "Systems And Methods For Processing Eggs" and hereby incorporated by reference herein; and of PCT Application No. PCT/US2011/021680 (Pub. No. WO2011/091011), also incorporated by reference, which PCT application in turn is a continuation-in-part of the following U.S. patent application Ser. Nos. 12/690,859, 12/690,872, 12/690,876, 12/690,886, 12/690,890, 12/690,896, and 12/690,898, all filed Jan. 20, 2010, each titled "Systems And Methods For Processing Eggs" and hereby incorporated by reference herein and which PCT application is an application claiming the benefit under 35 USC 119(e) of U.S. Provisional Application Ser. No. 61/296,837.

FIELD

Aspects of the present disclosure relate generally to the fields of food product processing, food safety assurance, efficient food distribution and particularly the packaging and shipment of eggs. Some described embodiments relate to containers for eggs and to methods and apparatuses for arranging eggs in a container.

BACKGROUND

Eggs represent a food product distributed and consumed in large quantities. For many of the same reasons making them desirable food stuffs, eggs also present a unique safety risk. Eggs (most commonly chicken eggs) contain nutrients which can support the growth of dangerous bacteria, when contaminated.

Eggs are a perishable item susceptible to spoilage, as well. To address the concern about spoilage—i.e., whether the egg is fresh—egg packages typically (and often by law or regulation) have expiration dates marked on them. However, eggs may be stored for days or even weeks before being sold at retail. Expiration dates, (a term encompassing such variations as "sell by" and "best if used by" dates) thus may not convey to a consumer or user how "old" an egg truly is. Many consumers, moreover, move eggs from their packages into special receptacles in their refrigerators. In this fashion, additionally, eggs from multiple cartons may come to be intermingled, usually indistinguishably. When these things are done, the consumer is no longer able to evaluate the expiration date of individual eggs prior to using them.

To reduce the chance of a consumer being sold a spoiled egg, certain governmental bodies in the United States and elsewhere, e.g., the United States Food and Drug Administration (FDA), the United States Department of Agriculture (USDA), and various state governments, currently do not allow retailers to "repack" eggs, i.e., to move eggs from one package to another. This restriction, unfortunately, can result in tremendous waste. For example, whenever the integrity of even a single egg in a package in the hands of a retailer is compromised (e.g., is broken), the entire package of eggs must be discarded.

Not only is this wasteful of otherwise good eggs, but also of the resources used to produce those eggs. Eggs typically undergo a great deal of processing before they are ready to be sold to the consuming public. In many circumstances, for example, eggs pass through several processing stations at which they are washed, candled, weighed, graded, and packed into packages (e.g., cartons, crates, or other commercially distributed containers). Examples of such processing stations and mechanisms for conveying eggs from station to station are described, for instance, in the following U.S. patents assigned to Diamond Automations, Inc.: U.S. Pat. Nos. 4,189,898; 4,195,736; 4,505,373; 4,519,494; 4,519,505; 4,569,444; 4,750,316; 5,321,491; and 6,056,341, the entire contents of each of which are incorporated herein by reference. It is not uncommon for a facility in which these stations operate to output about one million eggs in a single day. Accordingly, to be commercially acceptable, the throughput of the stations needs to be quite high, with some stations typically processing on the order of 20,000 eggs per hour.

When contamination (and possibly spoilage) of eggs is discovered, therefore, not only is it likely that the number of persons made ill—or worse—will be quite large, but also that enormous numbers of eggs must be recalled and destroyed. Many of those eggs will not have been contaminated and will have to be destroyed—at considerable financial loss—because there is no way to isolate the bad eggs from the total population of eggs from a suspect source.

Several techniques for marking individual eggs with expiration dates and the like have been proposed. One such approach is to use vegetable dyes or other water-soluble ink products to mark eggs. Such products, however, have a tendency to leak into the interior of eggs and can result in undesirable ink spots within them. The tendency of such products to wash off or fade also means that such markings are susceptible to tampering and even unintentional loss of integrity (e.g., dripping and smearing from condensation and handling), and has generally limited their acceptance.

It is also known to use lasers to mark indicia onto perishable products for the purpose of tracking their pedigree and/or integrity (e.g., using date codes and/or traceability codes), as well as for allowing textual or graphical advertising messages to be disseminated via such products. An example of a system for laser marking such information on hen eggs is described, for example, in U.S. patent application Ser. No. 11/725,099, Publication No. 2008/0223834 ("the '834 Publication"), published on Sep. 18, 2008. The disclosure of the '834 Publication is incorporated herein by reference in its entirety. Additional laser marking apparatus and methods are disclosed in, for example, U.S. patent application Ser. Nos. 12/690,859, 12/690,872, 12/690,876, 12/690,886, 12/690,890, 12/690,896, and 12/690,898, all filed Jan. 20, 2010, each titled "Systems And Methods For Processing Eggs" and hereby incorporated by reference herein; and in PCT Application No. PCT/US2011/021680, Pub. No. WO2011/091011 (the '011 Publication), which claims priority to these seven applications and is also incorporated by reference.

To use such a laser marking system to advantage, eggs preferably should be oriented in a predetermined fashion in order to facilitate focusing the laser beam, placing the markings uniformly on the eggs in a package and assuring that sufficient egg surface is exposed to the laser beam so that the entire intended marking can be applied. To facilitate achievement of such goals, the ''011 Publication discloses use of a mechanical orienter apparatus which helps position eggs in a container prior to being exposed to the laser beam.

While the mechanical orienter succeeds in desirably arranging the eggs for laser marking, it does nothing to maintain the positions of the eggs in their containers thereafter. As a result, in shipment and handling, eggs may tilt, twist (spin) and otherwise move within their containers and when a purchaser opens the container, the uniform arrangement of the eggs at the time of marking will not have been maintained. Due to such movements, some of the markings (e.g., freshness date and traceability information) thus may not be readily visible to the purchaser simply by opening the container. Further, such movement may contribute to breakage of some eggs.

Such movements, moreover, may induce the consumer to touch, spin and/or remove and replace the eggs in the carton, for the purpose of moving the egg back into its original forward-facing position, so the dates and traceability codes can be more easily read by the consumer, This touching and handling activity increases the risk of spreading disease organisms from hand to egg and from egg to hand, and then from hand to grocery wagon handle and other products in the supermarket. It also increases the risk of breakage—the more each egg is handled, the more eggs will break as a result of such handling.

It would be desirable in order to promote the readability of every egg when a purchaser opens a container of eggs, and to reduce movement and handling that might induce breakage and/or spread germs (especially in the supermarket), to somehow maintain eggs in their uniform arrangement from the time of marking until purchase. Or at least to do so more nearly than prior containers assure.

SUMMARY

Accordingly, it would be beneficial for an egg container to have receptacles that are configured to direct eggs dropped into the receptacles to both attain and maintain a uniform resting orientation for presentation of the eggs. Containers having receptacles so configured may be helpful both to facilitate laser (or ink) marking and to improve the display of indicia marked on the eggs. For example, when eggs are dropped or placed into receptacles of a container, various features of the receptacles may guide the eggs into a particular orientation where the eggs are uniformly tilted back toward the rear of the container in a neat orderly fashion, preferably avoiding side-to-side tilting (or at least making that tilting uniform, as well). Eggs may assume their resting orientation within receptacles of the container with or without use of an orienter and with or without further agitation of the container to assist the eggs in settling into suitable positions. Accordingly, when a person (e.g., consumer, employee, inspector, etc.) opens such a container full of eggs (also commonly referred to as an egg carton or box of eggs), the eggs may be oriented consistently within their respective receptacles such that markings displayed on the surface of the eggs are easily viewed.

It is desirable, also, to substantially maintain the resting orientation of eggs held within a container during shipping and/or handling. For instance, when eggs are marked with indicia and placed within receptacles of a container so as to have a particular orientation, or placed and then marked, it is preferable for each of the eggs to maintain that orientation during and after transit of the container. Accordingly, when eggs are marked and oriented so as to prominently display the markings on the surface of the eggs toward the front of the container upon opening and in plain sight, it is desirable for the eggs to substantially maintain that same orientation after a significant amount of shipping or handling.

Markings on eggs may be textual and/or graphical and used to provide information, such as messages, advertising or details about the eggs themselves (e.g., for egg traceability, freshness indication, etc.). Each container typically will include a plurality of egg receptacles, one per egg, disposed in one or more rows. When the eggs are uniformly oriented in their respective receptacles, as taught in the '011 Publication, this arrangement permits markings not only to be displayed on individual eggs, but also for messages or graphics to be displayed across multiple eggs.

In contrast with the reliance in the '011 Publication of an orienter to orient eggs in a conventional egg container, receptacles of an egg container may have various features that serve to guide the eggs into the type of resting orientation taught in the '011 Publication, such that in some embodiments, an orienter mechanism may not even be necessary. Such a resting orientation may involve, for example, a long axis of the egg being tilted toward a rear portion of the container at an angle slightly offset from a vertical axis of the container, and no significant side-to-side tilt. In some embodiments, eggs disposed in a container lean back toward the rear of the container about 5-10 degrees so as to expose a surface area of the egg facing toward the front of the container that is greater than the amount of surface area of the egg that would be exposed if the egg was vertically oriented. Such increased exposure allows for more of the egg to be visible to a person opening the container, hence, markings on the egg may be more readily apparent. This larger area for marking allows a larger and more prominent mark. In a container full of eggs, the resting orientation of each egg may be substantially similar, so that the eggs may be neatly arranged and presented together as a whole. Accordingly, the long axes of multiple eggs may be maintained to be substantially parallel, or within only a slight angle of one another, not only front to rear, but also on either side of the vertical axis of the container. (By "vertical axis of the container" is meant an imaginary vertical line through the center of the container when the container is resting in closed condition on a flat horizontal surface.) As a result, eggs may be marked and presented in a consistent manner.

Once settled into a suitable resting orientation within receptacles of the container, various features of the receptacles (and the container's cover) may serve to substantially resist movement (e.g., through rotation) of the eggs from the resting orientation that would otherwise occur, for example, when the container is agitated or jostled during shipping or handling. As such, despite substantial movement of the container itself, eggs disposed within receptacles of the container may be kept steady in their appropriate resting orientations. At the same time, while eggs are positioned and remain in suitable resting orientations that allow for more surface area on the eggs facing the front of the container to be marked and to be visible, containers described herein also reduce the possibility for eggs disposed in such resting orientations to be damaged.

The following paragraphs now provide a non-exhaustive enumeration of inventive aspects and features of the embodiments described, in greater detail below, and shown in the drawings.

As a first aspect, a container for holding eggs is provided. The container may comprise a plurality of receptacles, typically disposed in one or more rows, wherein each receptacle is constructed and arranged to hold an egg within a compartment of the receptacle so as to be substantially maintained in a resting orientation where a long axis of the egg is tilted toward a rear portion of the container at an angle slightly offset from a vertical axis.

According to another aspect, a receptacle for holding an egg is provided. The receptacle may comprise a compartment constructed and arranged to hold the egg in a resting orientation where a long axis of the egg is tilted at an angle slightly offset from a vertical axis. The receptacle may also include at least one guidance feature adapted to guide the egg upon entry into the compartment to reach the resting orientation and resist movement of the egg from the resting orientation. In some embodiments, the receptacle, indeed the container, is formed of a molded foam material of a type often used for some types of conventional egg containers. In some other embodiments, other materials, such as the paper-type materials used in some conventional egg cartons, may be used.

A method for arranging eggs in a container also is disclosed. The method includes placing a first egg within a first receptacle of the container, with the first receptacle being contoured such the first egg comes to rest in a first resting orientation with that a long axis of the first egg tilted toward a rear portion of the container at a first angle slightly offset from a vertical axis. A second egg is placed within a second receptacle of the container, with the second receptacle being contoured such that the second egg comes to rest in a second resting orientation with a long axis of the second egg tilted toward the rear portion of the container at a similar second angle slightly offset from the vertical axis. A cover may be applied to close the container, the cover including one or more depending members which bear lightly on each of the first and second eggs to resist movement of the first and second eggs from their respective first and second resting orientations, such that the long axes of the first and second eggs remain substantially parallel to one another during shipment of the container. The cover features and/or receptacle features may apply friction to the eggs to resist twisting of the eggs, as well.

A method for processing a package of eggs is disclosed which comprises adjusting a position of one or more of the eggs, as and/or after the eggs are placed in a container (also referred to as a package or carton), so that each of the eggs assumes a particular orientation within the package, utilizing features of the container alone or the container in combination with an orienter.

In some embodiments, the method may also comprise marking information on a surface of one or more of the eggs after the position of the one or more of the eggs has been adjusted.

Further, in some embodiments, the position of the one or more eggs in the package may be adjusted so that a long axis of each egg in the package is tilted toward the back of the package so as to be at least slightly offset from vertical and/or so that long axes of all of the eggs in each row of eggs in the package form approximate right angles with respect to a line intercepting bottoms of receptacles holding the eggs in such a row.

Another aspect is a method for processing packages of eggs on a conveyor which comprises using an egg orienter configured and arranged with respect to the conveyor so as to adjust a position of one or more of the eggs in each container as it progresses along the conveyor so that each of the eggs is assisted to assume a particular orientation within that package, in combination with a receptacle for each egg, shaped to maintain that orientation.

In addition, in some embodiments, the apparatus may further comprise a mechanism to mark eggs while the eggs are in a package disposed on the conveyor and in said particular orientation. This mechanism may be capable of laser and/or ink marking of the eggs. For example, the mechanism may include one or more ink jet print heads on a suitable carrier and/or one or more laser sources and one or more optical steering elements configured and arranged to direct laser energy from the laser source(s) so as to laser mark information on a surface of one or more of the eggs while the eggs are in a package so disposed.

In some embodiments, the receptacles in an egg container may be further configured and arranged to adjust the position of the one or more eggs in a container (package) so that a long axis of each egg is tilted toward the back of the package so as to be at least slightly offset from vertical and/or so that so that long axes of all of the eggs in each row of eggs in the package form approximate right angles with respect to a line intercepting bottoms of receptacles holding the eggs in such a row.

A package of eggs is disclosed which comprises a plurality of eggs arranged in one or more rows, each egg in a contoured receptacle. The receptacles are contoured such that a long axis of each egg in the package is tilted toward the back of the package so as to be at least slightly offset from vertical.

In some embodiments, each of the eggs in the package may have information marked on it in substantially the same location as the other eggs in the package, and the eggs may be oriented in the package such that markings on all the eggs face in substantially the same direction.

Various embodiments of the present invention provide certain advantages, many of which are discussed above and/or below, but some of which are inherent and should be apparent to those skilled in the art even without express discussion. Not all embodiments of the invention share the same advantages and those that do may not share them under all circumstances.

Further features and advantages of the present invention, as well as the structure of various embodiments of the present invention are described in detail below with reference to the accompanying drawings.

BRIEF DESCRIPTION OF THE DRAWINGS

The accompanying drawings are not intended to be drawn to scale. In the drawings, each identical or nearly identical component that is illustrated in various figures generally is represented by a like numeral. For purposes of clarity, not every component may be labeled in every drawing. Various embodiments of the invention will now be described, by way of example, with reference to the accompanying drawings, in which:

FIG. 3A is a side view of an egg held within a receptacle in accordance with an embodiment;

FIG. 3B is a front view a receptacle in accordance with an embodiment;

FIG. 8A shows a perspective view of a container having receptacles in accordance with some embodiments;

FIG. 8B depicts a section view of a number of receptacles of the container of FIG. 8A;

FIG. 11A depicts a top view of other receptacles in accordance with some embodiments with stabilizing features disposed over the receptacles;

FIG. 11B illustrates a section view of the receptacles of FIG. 11A with stabilizing features disposed over the receptacles;

FIG. 12A depicts a top view of more receptacles in accordance with some embodiments with stabilizing features disposed over the receptacles;

FIG. 12B illustrates a section view of the receptacles of FIG. 12A with stabilizing features disposed over the receptacles;

FIG. 13A depicts a top view of receptacles in accordance with some embodiments with stabilizing features disposed over the receptacles;

FIG. 13B illustrates a section view of the receptacles of FIG. 13A with stabilizing features disposed over the receptacles;

FIG. 14A shows a perspective view of a lid having stabilizing features in accordance with some embodiments;

FIG. 14B depicts a section view of a lid coupled with receptacles having eggs disposed within the receptacles in accordance with some embodiments;

FIGS. 17A and 17B illustrate side and front views, respectively, of an egg package containing eggs as it may appear after it has been processed by an egg orienter such as that shown in FIGS. 15A, 15B and 16;

FIGS. 20A and 20B are, respectively, side and top schematic diagrams of an alternative egg marking system illustrating marking with both laser energy and ink, in an embodiment that may be added on to most conventional egg grading and packing systems; and FIG. 21 is an isometric view of an alternative egg orienter apparatus comprising a pair or rotating resilient rods.

DETAILED DESCRIPTION

Figures 1A, 1B:
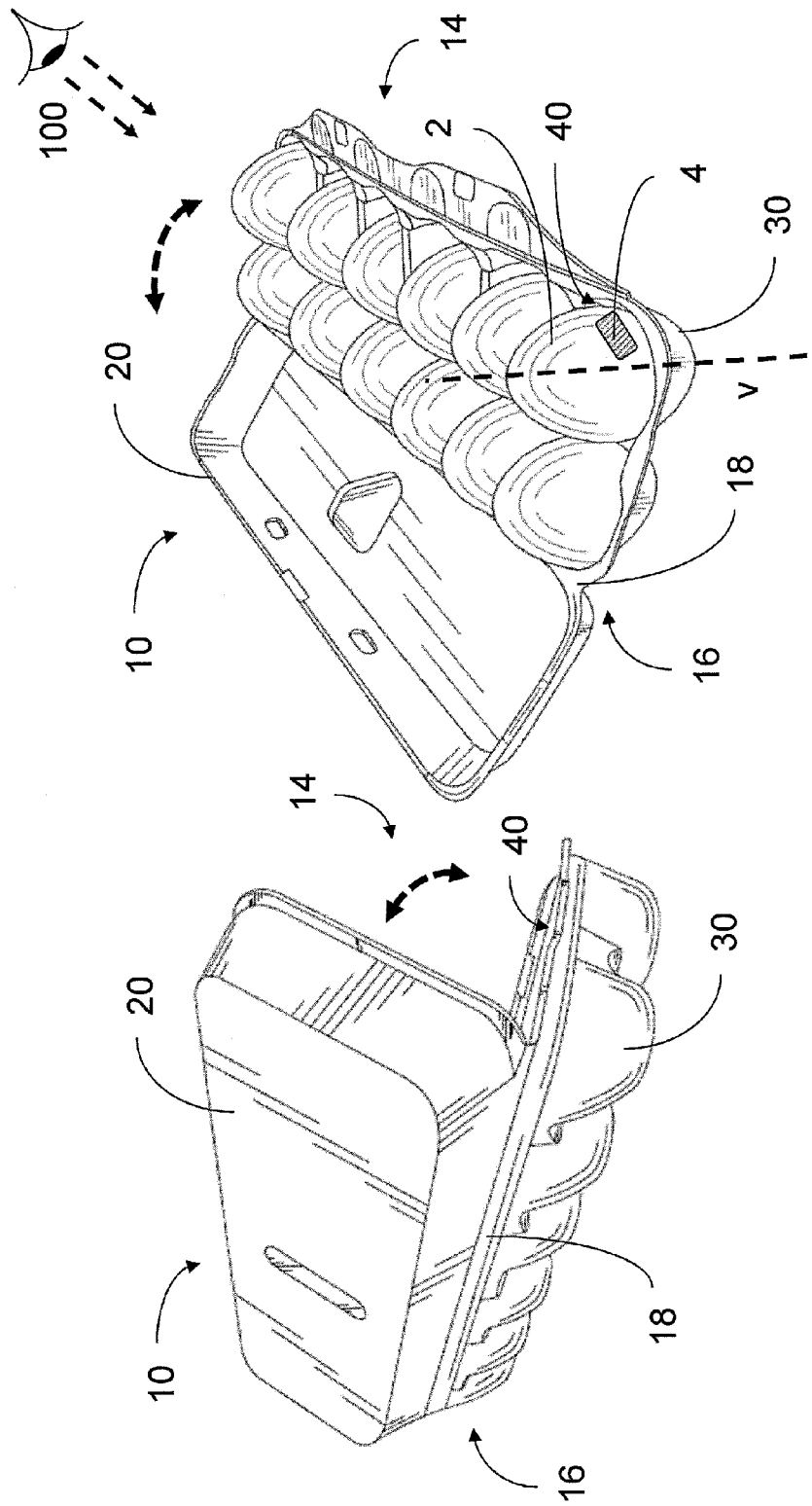
FIG. 1A is a perspective view of an egg container.
FIG. 1B is a perspective view of the egg container of FIG. 1A having eggs held within receptacles of the container.

The present disclosure relates to a container with receptacles that are configured to consistently guide eggs dropped into the receptacles into a particular resting orientation. The receptacles are also configured to hold the eggs so as to maintain their orientation within the receptacles in the resting orientation despite being subject to the forces of shipping and handling. A container that keeps the eggs in the same position during transit may greatly improve the overall display of indicia markings on the eggs, as well as reducing breakage.

The resting orientation of eggs held within the receptacles may be such that the eggs are tilted back toward the rear of the container. When the container is opened, the markings shown on the surface of the egg facing the front of the container are more prominently displayed and easily visible than if the eggs were not tilted back. For instance, the eggs may be arranged within the container such that when a person, such as a consumer, inspector or employee, opens the container, the eggs are oriented in a manner such that markings displayed on the front of the eggs are presented with a slight upward-facing tilt toward the person, in a consistent alignment with one another and, hence, easily viewed.

Receptacles of a container for holding eggs may have a number of features that serve to guide the eggs into a suitable resting orientation upon entry into the receptacle. In some embodiments, an egg that is dropped into a receptacle, without any particular orientation, may be directed into a suitable position by guidance features present within the receptacle. For example, as the egg falls into a compartment defined by the receptacle, the egg may come into contact with various guidance features of the receptacle that serve to urge the egg into a resting orientation where the long axis of the egg is tilted toward a rear portion of the container at an angle slightly offset from a vertical axis of the container. In some embodiments, eggs may be guided by features of the receptacles into their respective resting orientations automatically, i.e., by only the force provided by gravity. Alternatively, when eggs are dropped into corresponding receptacles, the container (and receptacles) may be slightly agitated so that the eggs are able to settle appropriately, or more rapidly, into designed resting orientations. This may be done intentionally by the addition of an agitation mechanism or it may occur naturally by virtue of the vibration and jarring caused by the packer mechanism by itself.

It will be appreciated that the aforementioned guidance features are optional and that in some embodiments tilting of the eggs may be accomplished without additional guidance features by receptacles that are contoured to support each egg in a tilted position. Such contouring may involve a surface that basically has the shape of a tilted egg, though the surface may be either curved like an egg or it may have tapered, flat sides that support the egg in limited places.

Once the egg has suitably attained an appropriate resting orientation, the receptacle preferably is also constructed to provide a sufficient amount of resistance to movement of the egg, particularly rotation and tilting, so as to substantially maintain the egg in the resting orientation, such as during marking, shipping or handling. Avoidance of movement during the marking process, be it laser marking or ink marking, is advantageous to achieve the clearest image production; egg movement during marking results in some amount of blurring. While the container itself having eggs suitably positioned within receptacles of the container may be subject to rough handling, the eggs are substantially held in place and prevented (e.g., by friction and/or an appropriate structural feature) from moving out of their respective resting orientations. Accordingly, a container full of eggs may be transported from one location to another without concern for whether the eggs will move from their designed resting orientation. And as a result, markings on eggs held within containers in accordance with aspects of the present disclosure will be consistently presented toward the front of the container, faced front and tilted upward, so as to be readily visible upon opening of the container.

FIGS. 1A and 1B illustrate a traditional container 10 for holding eggs having an upper portion 20 and a lower portion 30. The upper and lower portions of the container pivot about a hinge 18 located at a rear 16 of the container along the directions depicted by the double-headed dashed arrow, so as to open and close. FIG. 1A illustrates the container to be in a partially open configuration. The lower portion 30 includes receptacles 40 that are constructed to hold individual eggs, which can be visible from the front 14 of the container. As shown in FIG. 1B, eggs 2 placed in corresponding receptacles are held in an upright orientation such that the long axis of the eggs 2 are substantially parallel with the vertical axis v of the container. In some prior art embodiments, The eggs 2 may also have marked upon them indicia 4 on the surface of the eggs that faces the front of the container and are located near a central region or equator of the eggs.

A person opening an egg container will generally view the eggs from in front and above, indicated by the direction of gaze 100. In FIG. 1B, given the position of the indicia 4 and the orientation of the egg 2 within the receptacles 40, it will be difficult for an ordinary observer to accurately view the indicia 4. An improved field of view of the entire container of eggs may be obtained by tilting the container backward so as to align the indicia with the direction of gaze 100. However, tilting the entire container backward may increase the chances for the eggs to fall out of their respective receptacles, compromising their safety. Further, when tilting the container, the line of vision to some of the marking area on the back row(s) of eggs will be blocked by the front row of eggs. Hence the '011 Publication teaches, instead, tilting the eggs within the container.

Figure 2A:
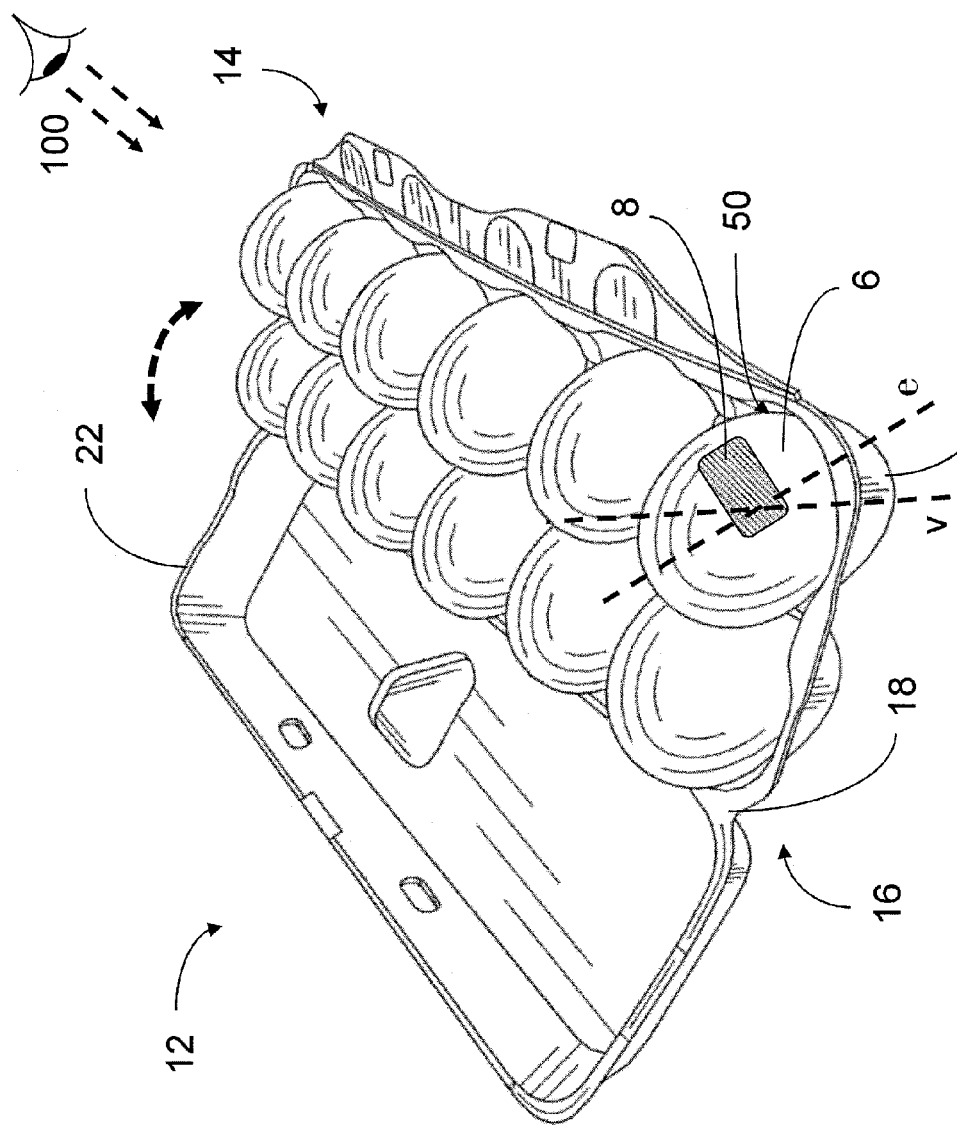
FIG. 2A is a perspective view of an illustrative embodiment of an egg container having eggs held within receptacles of the container arranged in a tilted back orientation.

FIG. 2A illustrates a container 12 in accordance with some embodiments of the present disclosure having an upper portion 22 and a lower portion 32 that opens and closes by pivoting about a hinge 18 located at the rear 16 of the container. The lower portion includes receptacles 50 that are constructed to hold individual eggs 6 in a tilted back resting orientation. (As illustrated, those receptacles are curved like eggs, though the sides of the receptacles could also be formed by a series of intersecting flat portions forming polygonal cross sections.) Accordingly, the long axis "e" of each of the eggs 6 makes an angle that is offset from the vertical axis "v" of the container, which is in contrast with the arrangement of FIG. 1B where the long axis of the eggs 2 and the vertical axis of the container are substantially parallel. The eggs 6 also have marked upon them indicia 8 on the surface of the eggs facing toward the front 14 of the container and typically located mostly on the top half of the eggs.

Such an orientation shown in FIG. 2A allows markings on the eggs to be more visible to a person opening the egg container than if the eggs were held in a conventional upright position with respect to the container. Accordingly, the indicia 8 marked on the eggs is presented in general alignment with the direction of gaze 100 so as to be in plain view. Thus, because the eggs are held in a position that provides for an increased degree of visibility of the presentation area where the egg is marked, a person viewing the indicia 8 would not have to tilt the entire container of eggs back to suitably view the markings on the eggs.

Figure 2B:
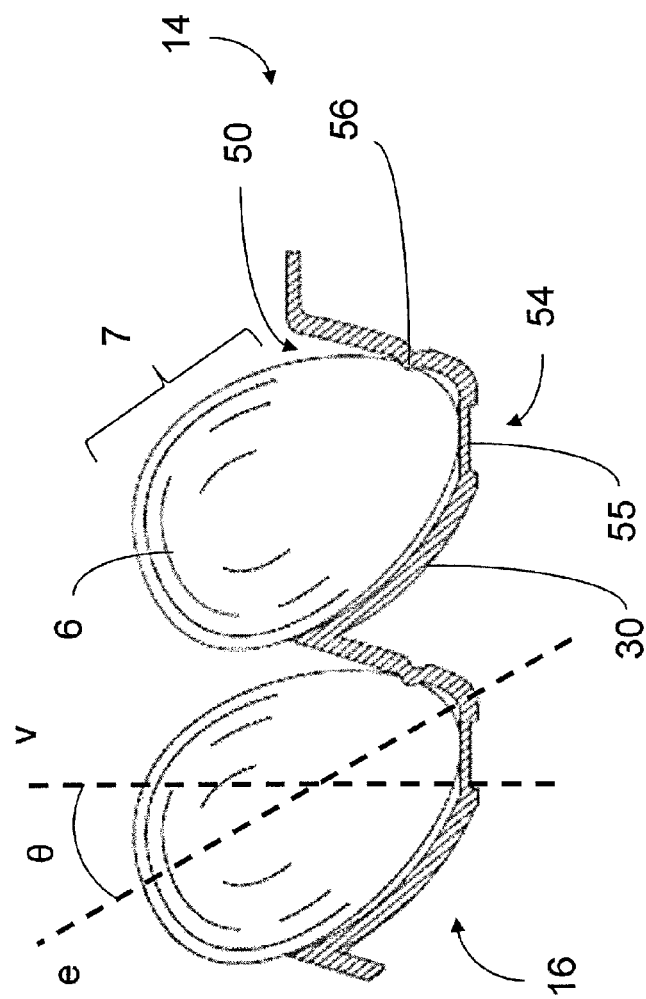
FIG. 2B is a section view of an illustrative embodiment of receptacles holding eggs arranged in a tilted back orientation.

FIG. 2B depicts an illustrative embodiment where eggs 6 held within receptacles 50 are tilted back toward the rear 16 of the container such that the long axis of each egg forms an angle θ with the vertical axis v of the container. A substantial amount of surface area 7 of the eggs facing the front 14 of the container is made available for marking thereon and subsequent presentation of the marking. In some embodiments, the angle θ created by the tilted long axis of an egg disposed in a resting orientation within a receptacle and the vertical axis of the container is at least 3 degrees, at least 5 degrees, at least 7 degrees, at least 10 degrees or at least 15 degrees.

The receptacle may have various structural features that serve one or more functions. For example, the receptacle may have a protrusion 56 that may be useful for maintaining the egg 6 in the same orientation by resisting movement of the egg once it is placed within the compartment of the receptacle. In addition, the inner surface of the bottom region 54 of the receptacle may also provide a friction surface within the compartment that assists in holding the egg in its resting orientation. In some embodiments, the exterior surface 55 of the bottom region 54 may be slightly indented from the exterior, as shown, so as to provide flexibility and cushioning for the receptacles of the container during transportation.

It may be preferable for the eggs to be consistently oriented in a uniform manner within the receptacles. That is, for some embodiments, the variation of the degree of tilt of the eggs disposed within the receptacles is small. With such uniform orientation, messages may be displayed across several eggs within a container as each egg may present a portion of the message. For example, the word "HELLO" may be suitably written across five different eggs adjacent to one another in a single row, where each egg has marked on its surface one of the letters of the word. Because the eggs are positioned in resting orientations that are consistent from one egg to another within a container, the letters of a word or phrase are arranged so that a person opening the container will quickly recognize the word or phrase and also see that each of the letters, or other indicia, are neatly arranged with little variation in their positioning. As well, this feature also aids viewing if all eggs in one or more rows are marked with the same indicium, by having all the marks aligned.

In some embodiments, the long axes of two eggs disposed within respective receptacles in a resting orientation and tilted back with respect to the vertical axis of the container are substantially uniform, being offset by no more than about 20 degrees (or, in some embodiments, no more than about 25 degrees, or no more than about 24 degrees, or no more than about 23 degrees, or no more than about 22 degrees, or no more than about 21 degrees, or no more than about 19 degrees, or no more than about 18 degrees, or no more than about 17 degrees, or no more than about 16 degrees, or no more than about 15 degrees, or no more than about 14 degrees, or no more than about 13 degrees, or no more than about 12 degrees, or no more than about 11 degrees, or no more than about 10 degrees, or no more than about 9 degrees, or no more than about 8 degrees, or no more than about 7 degrees, or no more than about 6 degrees, or no more than about 5 degrees, or no more than about 4 degrees, or no more than about 3 degrees, or no more than about 2 degrees, or no more than about 1 degree) from one another.

FIG. 3A shows a side view of a receptacle with an egg held within the compartment of the receptacle. Similar to that shown in FIG. 2B, the receptacle has a shape that is generally tilted back toward the rear of the container (to the right side of the figure, wherein the receptacle is shown from a side view). Whether the interior of the compartment (receptacle) is smoothly curved or formed of a plurality of flat wall sections, or otherwise configured, the compartment of the receptacle is asymmetrically shaped from front to rear with respect to the vertical axis, v. In other words, the long axis c of the compartment is tilted in a manner that gives rise to the corresponding tilt of an egg located within the compartment toward the rear of the container at an angle slightly offset from the vertical axis. In some embodiments, the long axis c of the compartment is substantially parallel to the long axis e of the egg when the egg is disposed and resting in the compartment.

As shown in FIGS. 3A and 3B, the bottom region 54 of the receptacle may include an interior surface that is rounded (i.e., at least in overall configuration, curved even if portions are somewhat flatter) and substantially tapered. In some embodiments, the tapered lower surface takes on the general shape of an egg. Such a substantially tapered lower surface may provide space for the egg to slide into the compartment of the receptacle pointier (narrower) end first, as occurs most of the time. Sometimes, though, eggs land blunter (wider) end first. Preferably, the receptacle is dimensioned and positioned such that the egg sits sufficiently low within the compartment as not to be exposed to potential damage upon closure of the receptacle (e.g., with a lid). In other words, because the egg is able to remain situated relatively low within the compartment, an upper region of the egg (e.g., the top of the egg) is not raised past a threshold height where the egg would otherwise likely be prone to damage when the receptacle is closed from the top. However, in some cases, receptacles may be structured so as to have less of a taper than that shown in FIGS. 3A and 3B and may even be shaped to have a generally flat lower surface, such as that shown in FIG. 2B.

Receptacles in accordance with aspects of the present disclosure may include a number of guidance features for directing an egg that is deposited over a receptacle compartment to settle into a suitable resting orientation. In some embodiments, a receptacle may include one or more railing elements that serve to steer the egg toward the center of the compartment, as opposed to leaning to one side or another, as well as to lean back toward the rear of the container, as the egg falls or slides into position.

Figure 4:
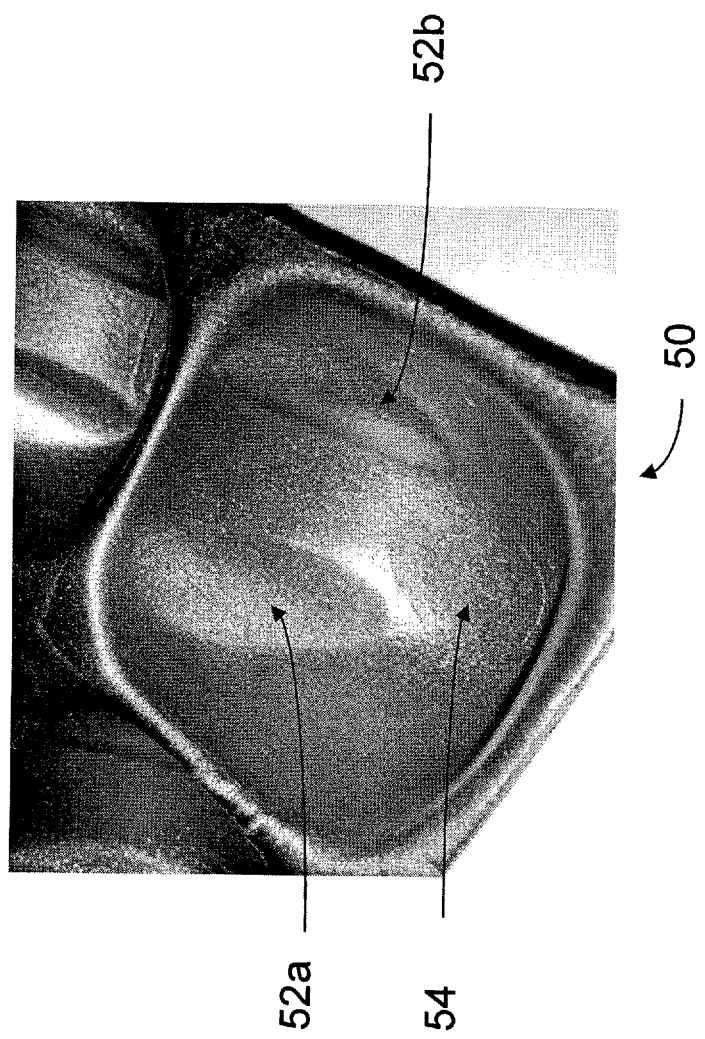
FIG. 4 is a perspective view of an illustrative embodiment of a receptacle for holding an egg.

FIG. 4 illustrates a receptacle including railing elements 52a, 52b disposed within the receptacle compartment that are constructed to guide an egg upon entry into the compartment to settle into an appropriate resting orientation. In some embodiments, railing elements of a receptacle are flexible and suitably structured such that upon entry of the egg into the compartment, a lower end of the egg is guided toward the front of the receptacle and into the resting orientation. Railing elements may also have sufficient flexibility so as to allow eggs to lightly bounce from the railing elements, absorbing shock and without inducing cracking in the eggs as they fall.

Figure 5:
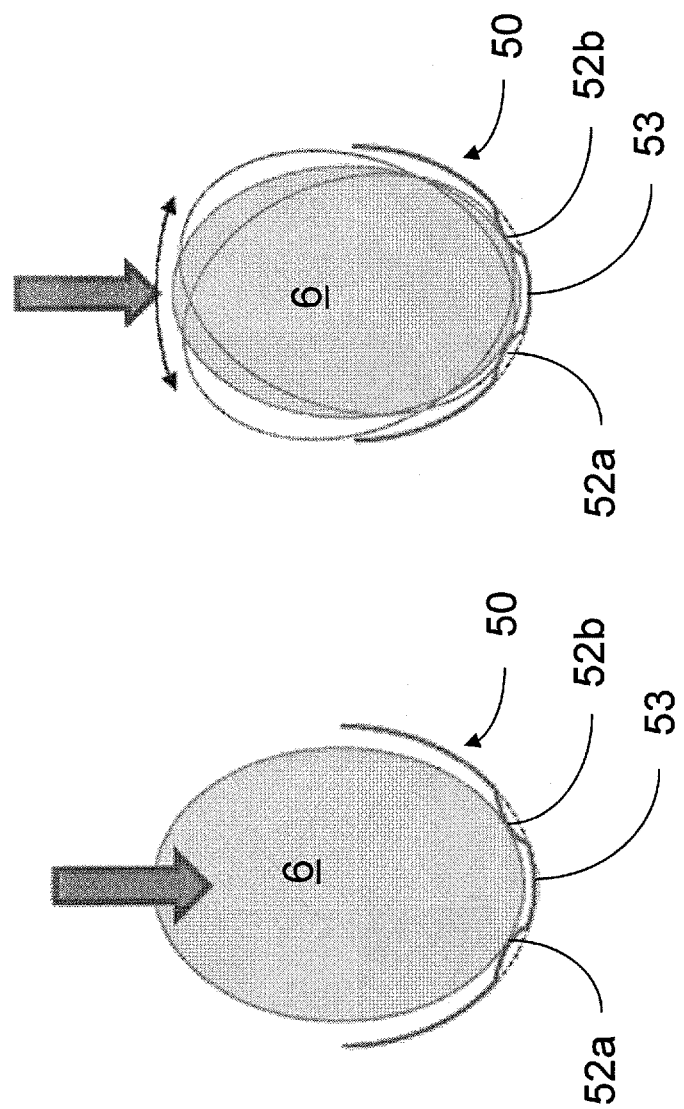
FIGS. 5A-5B show front section views of an egg held within a receptacle in accordance with an embodiment.

As shown in FIGS. 5A and 5B, an egg 6 that enters into the receptacle comes into contact with the railing elements 52a, 52b. The railing elements help to center the egg and resist side to side movement as the egg falls into the receptacle toward the bottom of the compartment and into a resting orientation. In some embodiments, the railing elements are spaced sufficiently near to one another such that, upon entry of the egg into the compartment, the egg contacts the surface of the railing elements 52a, 52b prior to contacting an interior surface 53 of the compartment that is disposed between the two railing elements. In some cases, the railing elements 52a, 52b prevent contact from occurring between the egg and the interior surface 53 altogether. It may be beneficial to have a structure within the receptacle that prevents a point of the egg from contacting the surface 53 of the compartment. Such a contact may provide for the point of the egg to stick to the surface of the compartment resulting in the egg rotating about itself and possibly topple into a direction that does not allow for the egg to finally settle into a desired resting orientation.

At the same time, it may be beneficial for the railing elements 52a, 52b to be short enough or spaced sufficiently apart from one another such that when the egg enters into the receptacle compartment, the egg is able to settle into the resting orientation without sitting too high within the compartment. If the egg sits too high where an upper region of the egg is raised past a certain threshold height, in some cases, the egg could be damaged when the receptacle is closed.

Railing elements may also be shaped to provide a generally small area of contact with the egg until the egg has settled down into a final position where it exhibits a resting orientation. Such a small area of contact with the egg before it finally settles into the resting orientation keeps to a minimum the amount of friction with the egg so that friction does not stop the egg from reaching a fully seated position. It also provides greater certainty in steering the egg to reach a desired final position during initial packaging of the egg. Once the egg has reached its final resting orientation, the railing elements and/or other guidance features of the receptacle may subsequently provide an appropriate amount of friction that resists movement (e.g., rotation, displacement) of the egg out of the resting orientation, for example, during transportation of the container.

Figure 6:
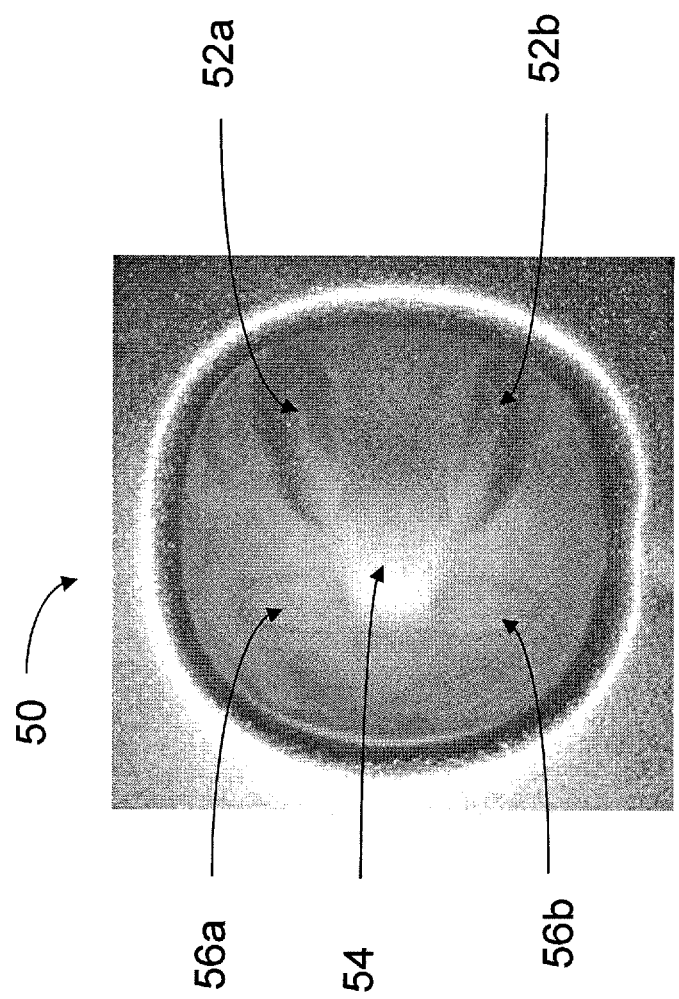
FIG. 6 shows a top view of an illustrative embodiment of a receptacle for holding an egg.

Suitable receptacles may also include a number of protrusions as guidance features located near or at the bottom of the receptacle compartment. FIG. 6 shows a receptacle having protrusions 56a, 56b situated so as to catch the egg having been guided into position by railing elements 52a, 52b. Based on the weight of the egg and the amount of surface area contact with the egg, the protrusion(s) in combination with the railing element(s) may provide structure with a sufficient amount of friction so as to hold the egg in place during shipping and handling.

Guidance features may be disposed at any suitable location in the space defined by the receptacle. While not so limited, as shown, the railing elements are situated in the receptacle so as to be closer to the rear of the container than the front and the protrusions are located in the receptacle in closer proximity to the front of the container than the rear. However, for some embodiments, railing elements are located closer to the front of the container than the rear. Similarly, protrusions may be located toward the rear of the container rather than the front.

In some embodiments, railing elements do not extend across the entire length of a base surface of the receptacle compartment. For example, railing elements that extend across the entire base surface of the compartment could contact an egg in an uncontrolled manner so as to induce an unfavorable bounce in the egg, leading to misalignment in the final orientation of the egg.

Similar to other guidance features, protrusions situated at or near the bottom of the receptacle compartment may be sufficiently sized so as to resist movement of the egg, yet at the same time, not allowing the top of the egg (e.g., jumbo, large or extra-large sized), when fully settled, to reach past a height such that the egg may be at risk of being damaged when the receptacle is closed. Protrusions may be flexible and suitably able to be compressed depending on the weight of the egg and the amount of surface contact the protrusion has with the egg.

Figure 7A:
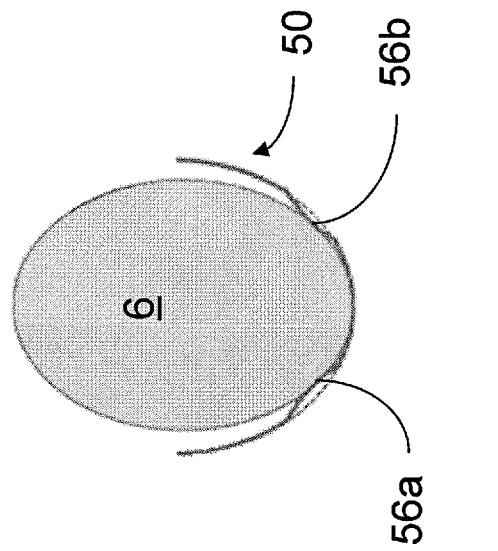
FIGS. 7A-7C depicts front section views of an illustrative embodiment of a receptacle holding differently sized eggs.
Figure 7B:
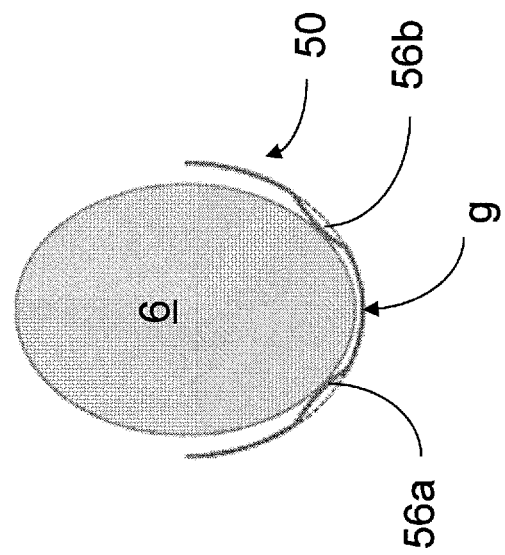

As shown in FIG. 7A, the protrusions 56a, 56b may be in contact with the bottom surface of the egg 6 so as to hold the egg in place, yet might not be so compressed. For instance, when the egg is positioned in a final resting orientation, a gap g may be present between the inner surface of the receptacle compartment and the bottom surface of the egg. Alternatively, FIG. 7B shows an egg disposed in a final resting orientation within the receptacles such that the protrusions 56a, 56b are more slightly compressed.

Figure 7D:
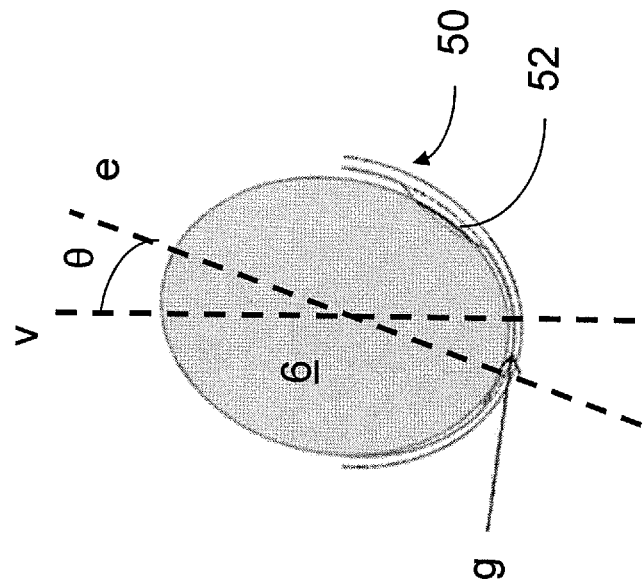
FIG. 7D depicts a side section view of an egg held within a receptacle in accordance with an embodiment.
Figure 7C:
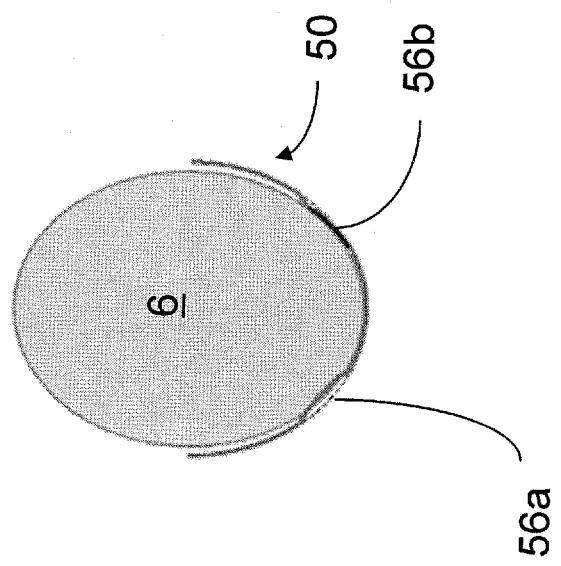

FIG. 7C depicts a front view of an extra-large sized egg 6 disposed in a receptacle compartment resulting in the protrusions being fully compressed, due to the weight of an extra-large sized egg. FIG. 7D shows a side view of the egg leaning back toward the rear of the container where the long axis e of the egg is offset from the vertical axis v of the container. In this embodiment, when the egg is settled into an appropriate resting orientation, the railing elements 52 are slightly compressed. The weight of the egg and surface contact area of the railing element(s) or other guidance features (e.g., protrusions) with the egg may provide an appropriate amount of friction sufficient to resist movement of the egg out of the resting orientation during transit.

As further shown, when the egg has reached its resting orientation, a gap "g" may remain under the egg, which may provide for a degree of tolerance during handling of the container so as to avoid impact on the egg which may lead to detrimental damage (e.g., cracking, piercing). For some embodiments, the bottom surfaces of eggs are held slightly away from the inner base surface of the receptacle compartments, allowing space for the compartments to be compressed before contact, and potential damage, is made with the egg surface. Incorporation of compressible protrusions in the receptacles may help to provide tolerance in this respect. In some embodiments, when positioned in the resting orientation, the gap g between the bottom of an egg and the inner surface of the base of the compartment may be between about 0.01 inches and about 0.1 inches, between about 0.02 inches and about 0.08 inches, between about 0.03 inches and about 0.05 inches, or about 0.04 inches.

As discussed above, receptacles may have any appropriate number of guidance features that direct an egg falling into the receptacle compartment into a suitable resting orientation, by gravity alone or with some slight agitation. In addition, once the egg is settled into the resting orientation, such guidance features may also serve to resist movement of the egg away from the resting orientation. Guidance features may include, but are not limited to railing elements and protrusions disposed in the compartment of the receptacle. FIGS. 8A and 8B depict illustrative embodiments of receptacles 50a-50l having a number of guidance features 52a-52l for guiding eggs placed in corresponding receptacles into tilted back resting orientations. Such guidance features may be railing elements, protrusions or any other appropriate feature for assisting eggs to settle into a suitable resting orientation within the receptacles and by virtue of friction, resisting movement of the eggs out of the resting orientation during routine shipping or handling.

FIG. 8B shows receptacles 50h, 50i, 50j, 50k having guidance features 52h, 52i, 52j, 52k, respectively. Guidance feature 52h incorporates a U-shaped railing that, upon contact with an egg, serves to steer the egg along the center between the ends of the U-shaped railing to slide into the resting orientation. Guidance feature 52i involves two protruding elements separate from one another that may also function to guide the egg between the elements into the resting orientation. Guidance features 52j, 52k involve a single protruding element, not so limited in shape, where each of the embodiments functions to provide the egg with a sufficient amount of surface contact that results in the egg settling down into the receptacle compartment in the resting orientation. In some embodiments, guidance features involve a pair of elements much like guidance feature 52i. In some embodiments, guidance features include a single element similar to guidance features 52h, 52j, 52k. In some embodiments, one or more guidance features are disposed along a nominal centerline of the egg, similar to guidance features 52j, 52k. Other guidance feature arrangements of the receptacle are also possible.

Various features of the container such as the lid, receptacles and guidance features may comprise any suitable material. Suitable materials include, but are not limited to, a foamed material (e.g., Styrofoam), plastic, polymer (e.g., polyurethane, polyester, polystyrene), paper (e.g., molded pulp, recycled paper), elastomer (e.g., rubber), cardboard or combinations thereof. Guidance features may comprise the same or a different material than that of the receptacles and in the case of molded containers, may be incorporated into the molds.

In some embodiments, stabilizing features may be positioned over the entrance to the receptacles so as to gently hold the eggs in their respective resting orientations. For example, stabilizing features may include small flexible finger-like elements that apply low pressure contact to the surface of the egg so that the egg is pressed against guidance features, such as protrusions or railing elements, disposed on the opposite side of the egg. Such gentle contact between opposing features of a receptacle serves to substantially prevent movement (e.g., rotation) of the egg due to vibration, agitation, or loss of contact between the surface of the receptacle and the egg that would otherwise occur. These various features around the entrances to the receptacles further are intended not only for stabilizing but also to contact the egg when it is falling into the receptacle, imparting a slight drag on that side of the egg, causing the egg to tilt to a preferred angle during the process of falling before reaching the bottom of the receptacle.

Stabilizing features may include any suitable material, such as any of the materials listed above with respect to the lid, receptacles and guidance features. Stabilizing features may be flexible enough so as not to induce cracking in the egg upon contact. For example, stabilizing features may be flexible to provide appropriate levels of force to accommodate different sizes and shapes of eggs. In some cases, stabilizing features can be suitably flexible with respect to the egg by matching the material thickness of the stabilizing feature with the shape of the egg. That is, the material of the stabilizing feature may be constructed to be thicker at regions of the egg where the egg has greater strength and thinner where the egg is more fragile.

Figure 9:
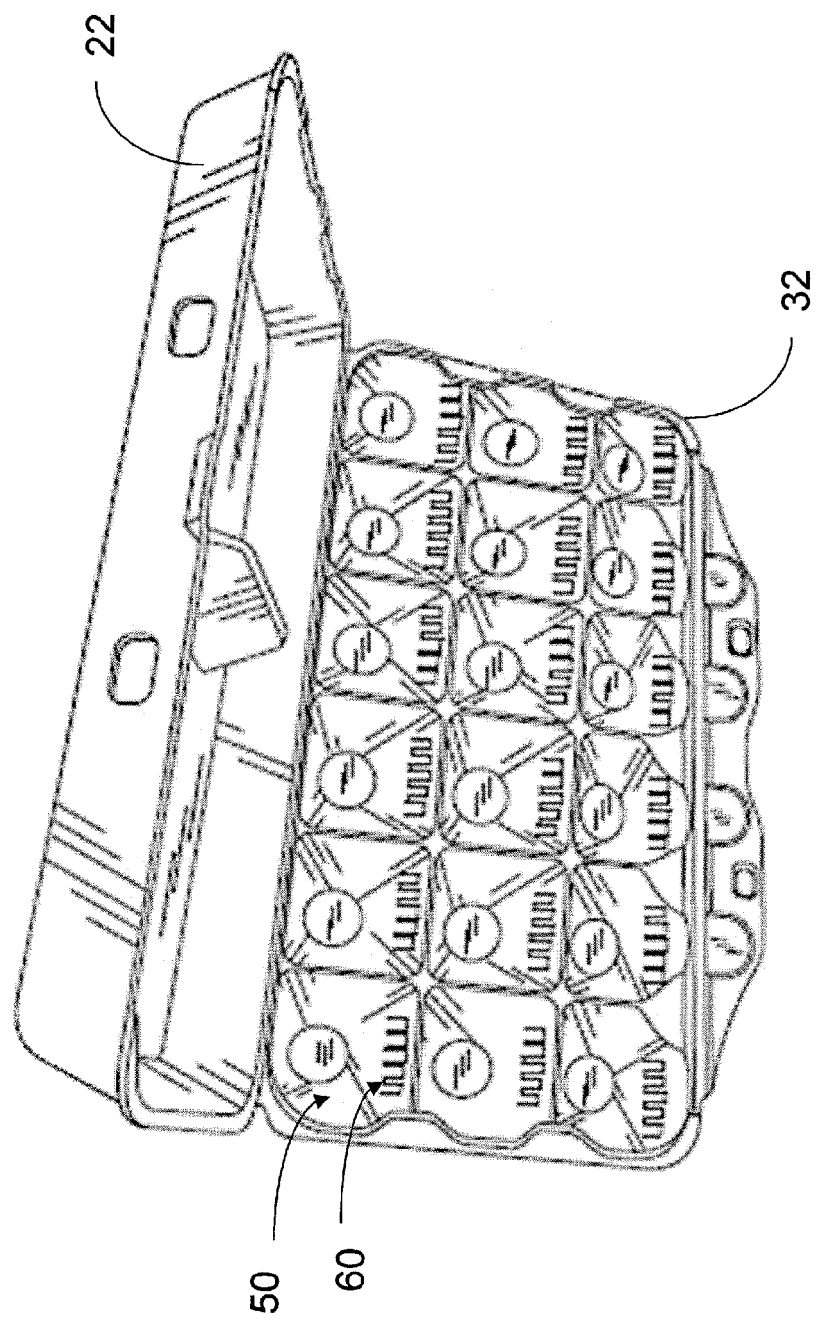
FIG. 9 shows a perspective view of another container having receptacles in accordance with some embodiments.

FIG. 9 shows an illustrative embodiment of a container having stabilizing features 60 disposed over the receptacles 50 and positioned to gently hold individual eggs safely within respective receptacles so as to maintain their resting orientation. The location of the stabilizing features is not so limited. For instance, stabilizing features may be provided as part of each receptacle or part of a lid on the upper portion that extends over the receptacles for closing the container altogether.

Figure 10A:
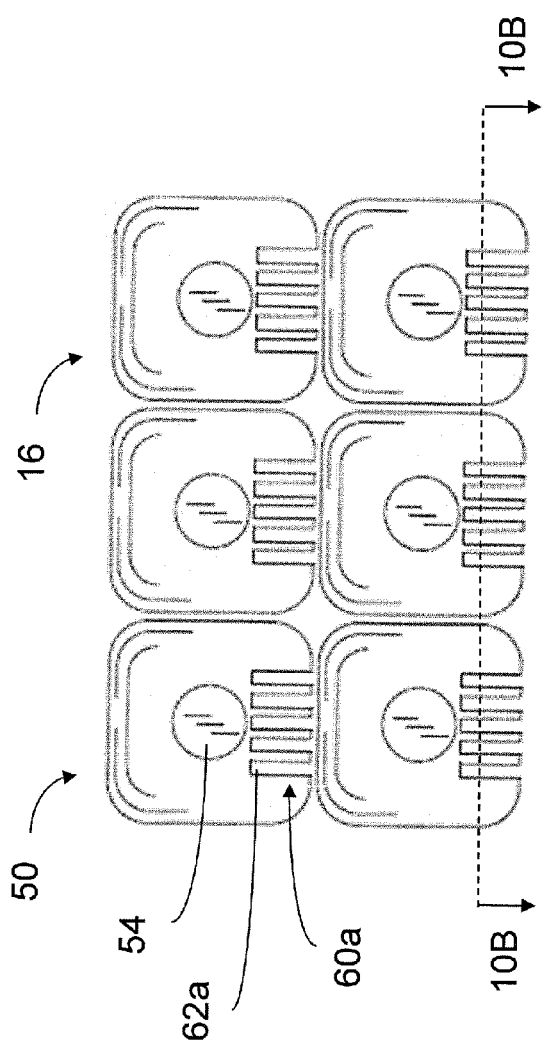
FIG. 10A depicts a top view of a number of receptacles in accordance with some embodiments with stabilizing features disposed over the receptacles.
Figure 10B:
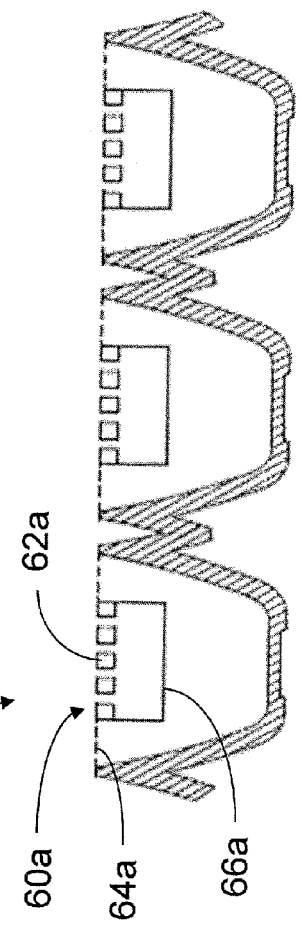
FIG. 10B illustrates a section view of the receptacles of FIG. 10A with stabilizing features disposed over the receptacles.

FIGS. 10A and 10B show a number of receptacles 50 where stabilizing features 60a are provided as finger-like elements 62a. The finger-like elements 62a are flexible and extend toward the egg disposed within the receptacle so as to provide a gentle pressure against the surface of the egg, urging the egg into position. In some embodiments, a guidance feature (e.g., railing element, protrusion) is disposed on an opposite side of the egg as the stabilizing feature and may provide an opposing force that counteracts the gentle pressure provided by the stabilizing feature. As shown in the section view of FIG. 10B, the finger-like elements 62a may pivot about an axis 64a and reach down into the compartment of the receptacle a distance defined by a reference line 66a.

In some embodiments, stabilizing features such as finger-like elements 62a are flexibly adapted (e.g., elastomeric) to return back to an original configuration despite being deformed or stretched out of position. For example, as shown in FIGS. 10A and 10B, finger-like elements 62a may be constructed in an original configuration so as to extend along the entryway of the receptacle perpendicular to the vertical axis of the container. However, an egg placed into the receptacle may contact the finger-like elements to induce bending out of the original configuration (e.g., into or away from the receptacle compartment). Though, the elastomeric nature of the finger-like elements to return back to their original configuration may generate a gentle pressure that opposes the pressure provided by guidance features disposed on the other side of the egg, resulting in the egg being held stably in the resting orientation.

FIGS. 11A and 11B illustrate receptacles 50 having stabilizing features 60b that include finger-like elements 62b of varying length. In this embodiment, the finger-like elements 62b are flexible, extending toward the egg, and the dimensions of the finger-like elements 62b are constructed to suitably conform with the rounded surface of the egg. Similar to that described above with respect to FIGS. 10A and 10B, the finger-like elements 62b may have an original configuration where they extend perpendicular to the vertical axis of the container and may also pivot flexibly about an axis 64b with the ability to reach down into the receptacle compartment a distance illustrated by a reference line 66b. When compressed against the egg, the curved shape of the finger-like elements may allow for contact with the egg over a greater surface area than would otherwise be the case for straight finger-like elements.

FIGS. 12A and 12B show receptacles 50 having stabilizing features 60c in the form of flaps 62c. The flaps 62c are flexible and extend toward an egg sitting within the receptacle. Additionally, the flap may be angled so as to conform appropriately with the rounded surface of the egg. In some embodiments, the flaps 62c are elastomeric and have an original configuration where the flaps extend along the entryway of the receptacle perpendicular to the vertical axis of the container. The flaps also pivot flexibly about an axis 64c on the same side of the receptacle where the flaps have the ability to reach down into the receptacle compartment a distance shown by a reference line 66c.

Receptacles 50 shown in FIGS. 13A and 13B have stabilizing features 60d in the form of flaps 62d with axes 64d that are located on opposite sides of the receptacle. Similar to that shown in FIGS. 12A and 12B, the flaps 62d are flexible and extend toward an egg sitting within the receptacle. The contour of the flaps is also angled to suitably conform with the rounded surface of the egg. In some embodiments, the flaps 62d are elastomeric and have an original configuration where the flaps extend along the entryway of the receptacle perpendicular to the vertical axis of the container. The flaps also pivot flexibly about respective axes 64d located on opposite sides of the receptacle and are able to appropriately reach down into the receptacle compartment, as shown in FIG. 13B.

Figure 14C:
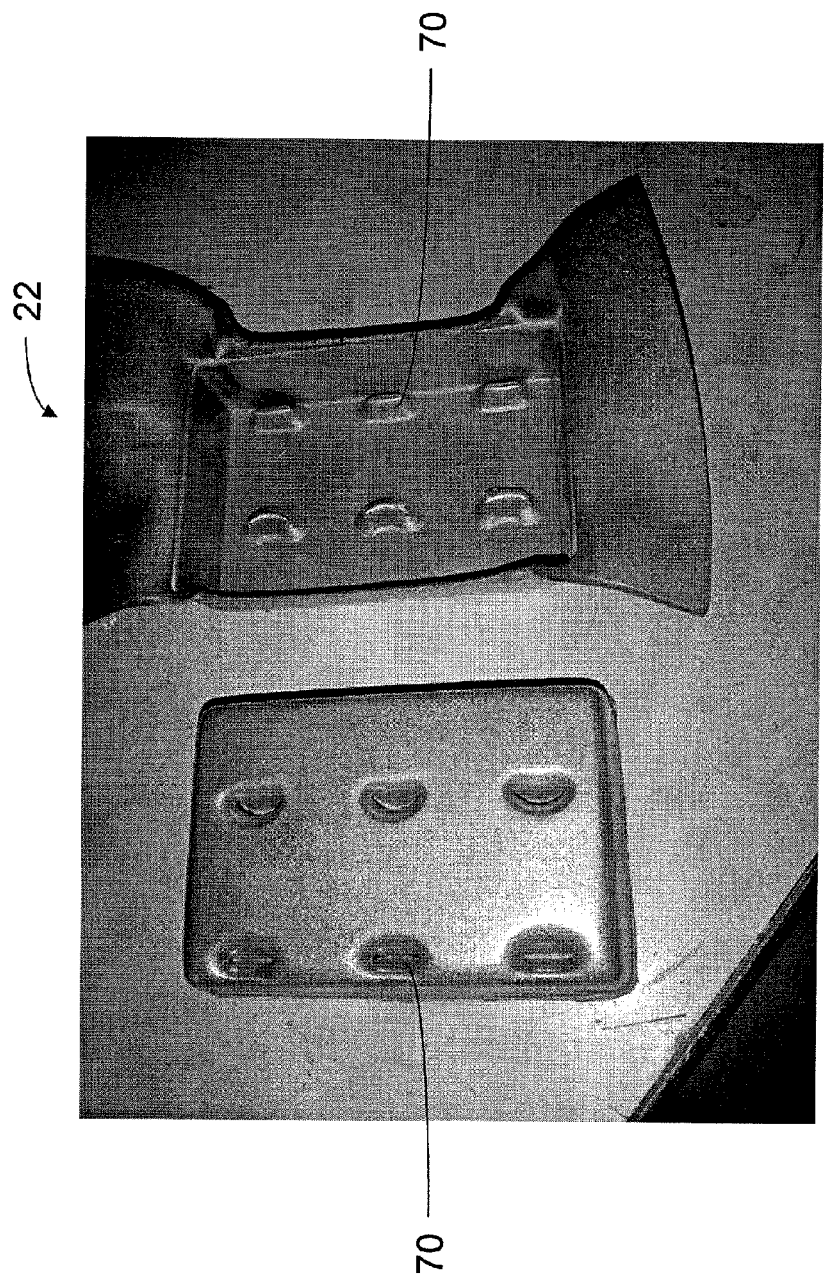
FIG. 14C shows perspective views of another lid having stabilizing features in accordance with some embodiments.

As discussed above, stabilizing features optionally may be provided as part of a lid on an upper portion of the container, for closing the container. FIGS. 14A-14C illustrate an upper portion 22 of a container, shown as a lid (cover) for covering the receptacles with the eggs positioned therein. The lid includes stabilizing features 70 that are curved for gently pressing against the egg contained within the receptacle in a manner that does not to incur damage on the egg. Such a curvature may increase the surface contact area between the stabilizing feature and the egg, resulting in a reduced local pressure at any one region of the egg. FIGS. 14A and 14C illustrate the stabilizing feature 70 to be incorporated as part of the lid for the receptacle, however, other arrangements for such a stabilizing feature are possible.

FIG. 14B illustrates eggs disposed in resting orientations where the eggs are leaned back toward the rear 16 of the container. In this embodiment, guidance features 52 and stabilizing features 70 are flexible to provide cushioning for the eggs while also working in combination to maintain the eggs in their resting orientations through gentle contact, preventing rotation of the eggs during transit. Accordingly, upon opening the container, the eggs are presented in a consistent manner where indicia that may be marked on the eggs are prominently visible to a viewer looking down at the eggs.

In some embodiments, the container design may permit the omission of stabilizer fingers to hold the egg still during the marking process. By using a receptacle that holds the egg in a specific position, additional stabilization may no longer be needed.

As discussed above, eggs may be marked with information which may include, for example, a freshness date, a traceability code and/or advertising. It has been recognized that in order for a means of marking eggs with indicia suitable for repacking purposes to be both widely commercially viable and economically feasible, it is important for a large percentage of the eggs processed to have clear, legible, consistent markings. One reason for this is that, in many circumstances, eggs that are mismarked with such indicia must be discarded, for one reason or another. Such a concern is the subject, in part, of the International Publication No. WO 2011/091011 (the '011 publication), which is incorporated herein by reference in its entirety.

Once the quality and reliability of egg marking such that large percentages of eggs are have clear, legible and consistent markings on them (whether evaluated objectively or subjectively) is addressed, it may be advantageous to incorporate within egg marking systems the ability to manipulate eggs so as to be oriented in container packages in a particular (uniform) manner in advance of or after the printing process.

Accordingly, eggs may be placed in a container having receptacles incorporating appropriate guidance and/or stabilizing features such that, upon entry of an egg into a receptacle, the egg is automatically guided by force of gravity (with optionally slight agitation) by the path determined by the guidance and/or stabilizing features into a preferred resting orientation. As a result, all of the eggs in a container may be centered and tilted slightly backwards, uniformly where a relatively large surface area of the egg will be immediately visible to a consumer (or an inspector, vendor, or other person) who opens the package. By so orienting the eggs in the package prior to the printing process, the amount of "visible" surface area made available to the laser (and ink head, if used), for marking, may be increased. In addition, the information that is actually marked on the eggs (expiration dates, tracking codes, advertisements, etc.) will be readily communicated to the consumer (or an inspector, vendor, or any other person who might subsequently open the package) immediately upon opening the package. As an example, a consumer opening a container (e.g., carton) of eggs may immediately be presented with neatly arranged, uniformly oriented rows of eggs, each having information such as a company's logo and/or an expiration date prominently displayed at the same location and directly facing the customer.

In addition, once the eggs in a container are positioned uniformly in their resting orientations so as to allow a person to readily view the information marked on the eggs, various features of the receptacles also resist movement of the eggs from the resting orientation during shipping or handling. During transit, individual eggs are often subject to substantial vibration or agitation that induces rotation or displacement of the eggs to a position that is different than that of the other eggs held within the container. Aspects of the present disclosure significantly increases the probability that eggs held within a container and positioned in an orientation that enables a person to easily view the information marked on the eggs upon opening the container will maintain such an orientation despite being subject to shipping and handling. Eggs placed in containers described herein will maintain their resting orientation where information marked on the eggs remains prominently displayed before, during and after transit. It can be appreciated that systems and apparatuses described herein, including containers with tilted receptacles having appropriate guidance features, may be readily incorporated with existing egg packing equipment functions without requiring substantial modification to the equipment or any modification at all.

The following describes a system where eggs are both marked and placed within containers. It can be appreciated that packages used in cooperation with systems described below may incorporate containers having receptacles in accordance with aspects of the present disclosure. For example, suitable embodiments of containers discussed herein may be implemented with an orienter(s) contemplated for uniformly urging eggs into a suitably presentable resting orientation, such as those orienters described in the '011 Publication.

Figure 15A:
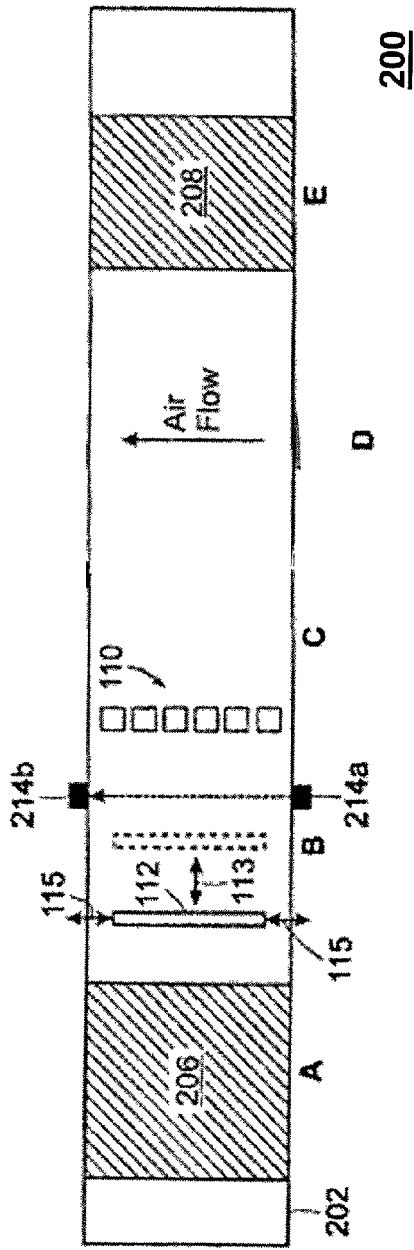
FIGS. 15A and 15B are partial block diagrams of top and side views, respectively, of a portion of a conveyor used by a marking system and various components that may operate in conjunction therewith.
Figure 15B:
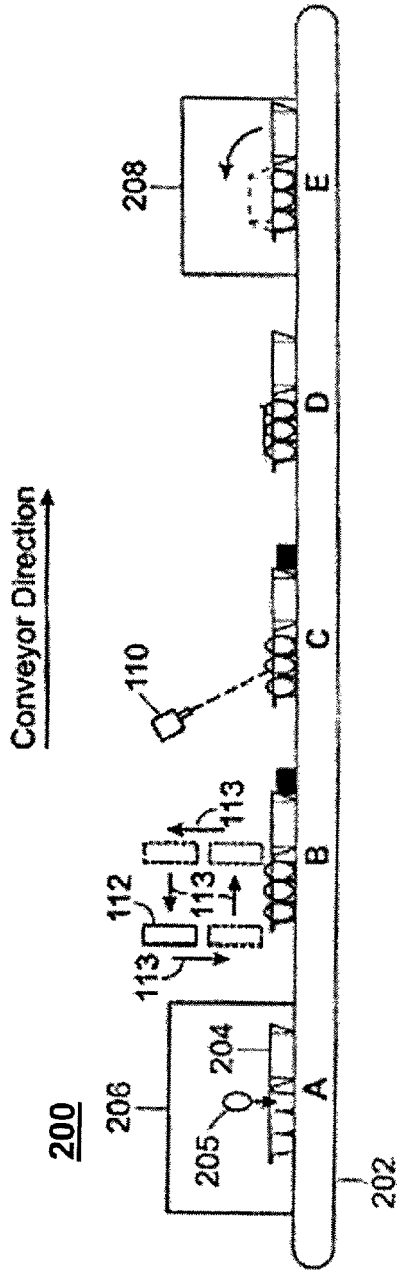

FIGS. 15A and 15B are block diagrams showing, respectively, top and side views of a portion of the conveyor and related components that may be disposed between an egg loading section 206 and a package closing section 208 of one of the two portions of the egg packing apparatus 200, as shown and described in the '011 publication. In the illustrative example shown, the conveyor is controlled so as to move packages 204 sequentially to each of five primary locations A-E. At each such primary location, moreover, the conveyor causes the package 204 to move sequentially through a series of sub-locations equal to the number of rows of eggs 205 (the reference 205 being to the eggs themselves) in the packages 204 being loaded. This occurs because the egg loading section 206 typically loads one row of six eggs 205 at a time, thus requiring the conveyor 202 to move the package slightly forward prior to loading each new row of eggs. A typical egg packer will process approximately at a rate of 55 cases of eggs per hour, with each case including 30 dozen eggs. At this rate, the packages may, for example, spend approximately 3-5 seconds at the primary locations A-E before being moved by the conveyor 202. The packages may thus, for example, spend approximately 1-2 seconds at each of the sub-locations within each of locations A-E (i.e., while each row of eggs is treated).

In the example shown, the conveyor 202 first moves the package 204 to a primary location A within the egg loading section 206 of the egg packing apparatus 200. As shown, when the package 204 stops at this section, a number of eggs 205 corresponding to the number of receptacles in the package 204 (e.g., twelve, eighteen, or more) are disposed into the package 204. As noted above, the eggs may be loaded one row (e.g., six eggs) at a time, with the conveyor 202 advancing the package 204 slightly to allow for subsequent rows to be loaded.

Figure 16:
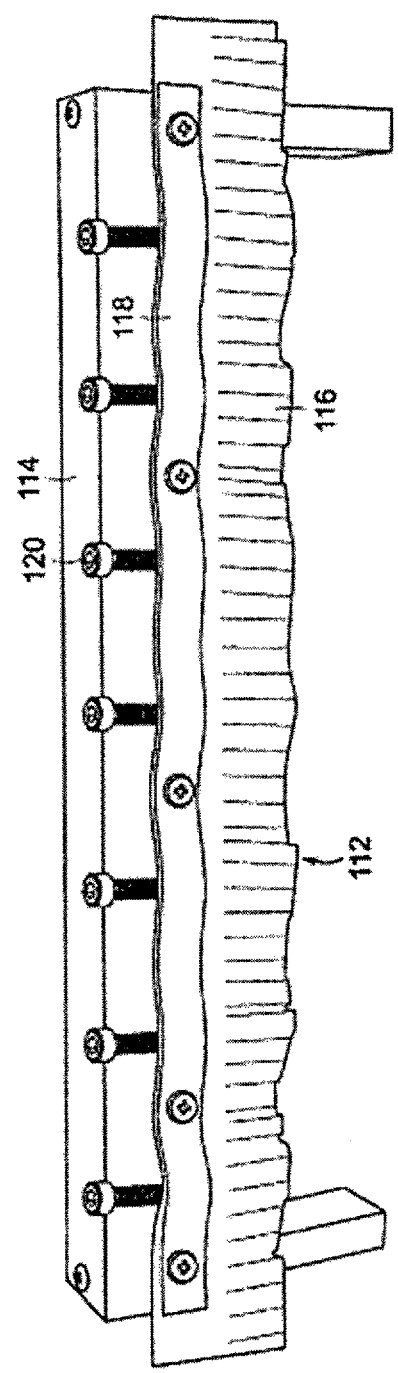
FIG. 16 is a perspective view of an illustrative embodiment of an egg orienter that may be used in a system such as that illustrated in FIGS. 15A and 15B.

Next, the conveyor moves the package 204 to a location B where, if an orienter is employed, an operation is performed to orient the eggs to a desired position for laser marking as well as for display to a consumer who ultimately opens the package 204, or perhaps to an inspector or an employee of a retailer or distributor who later examines the eggs for inspection and/or repacking purposes. As shown, if a container as shown herein is not employed, the eggs 205 may be oriented in a somewhat haphazard manner within the package at the time they reach the location B. Once they reach the location B, however, an egg orienter 112 may be operated so as to reorient the eggs into the desired position. Even if the improved container discussed herein is used, it still may be advantageous to employ an orienter apparatus to "fine tune" egg positioning. The egg orienter 112 may be any of numerous devices capable of reorienting the eggs within the package, and the invention is not limited to any particular device or structure for performing such a function. One illustrative example of an egg orienter 112 suitable for this purpose is shown in FIG. 16. It should be appreciated that the egg orienter 112 may be located at any of numerous positions along the conveyor 202 and need not be located the particular location shown. In some embodiments, for example, the equipment at the positions B and C in FIGS. 15A and 15B may be combined so as to operate on cartons of eggs located at the same position. Additionally, in some embodiments, the egg orienter 112 may be positioned to the right of the galvanometers (galvos) 110 of the laser marking system shown in FIGS. 15A and 15B, rather than to the left thereof.

As illustrated by arrows 113 adjacent the egg orienter 112 in FIGS. 15A and 15B, the egg orienter 112 may first be moved (e.g., using via a pneumatic piston or another suitable actuator or motor—not shown in FIGS. 15A and 15B) down behind the egg package 204 and then may be swept forward (in the direction of normal belt movement) across the rows of eggs 205 (typically two or three rows of six eggs each).

With an egg orienter alone (i.e., without the improved container disclosed herein), preferably stabilizer fingers (discussed elsewhere in this disclosure) preferably are provided to stabilize the positions of the eggs after they have been oriented. However, the herein disclosed container obviates the need for such stabilizer fingers.

As illustrated by arrows 115 in FIG. 15A, as it is moved forward, the egg orienter 112 may also be shimmied (e.g., using a rotating pneumatic actuator or another suitable actuator or motor—not shown in FIGS. 15A and 15B) in a side-to-side fashion so as to help overcome the friction between the eggs 205 and the receptacles of the package 204; or another mechanism may be employed for this purpose. Alternatively, other friction-reduction approaches may be substituted. Finally, the egg orienter 112 may be raised and then moved back to its starting position until another row of eggs is moved into location B for processing. In some embodiments, the egg orienter 112 may be swept across the entire package of eggs in a single pass. Alternatively, it may be swept across one row of eggs 205 at a time each time the package 204 is moved to a new sub-location within location B. Further, in some embodiments, multiple orienters 112 may be employed, operating either independently or in collective (i.e., ganged) fashion—e.g. spaced one egg-row apart from one another. They may, for example, be driven by a single mechanism and move in unison. This would achieve multiple orienting actions per row of eggs.

In some embodiments, moreover, an egg orienter mechanism may be operated, and operate on the eggs, while the carton (container) is moving, so long as the orienter device moves faster than the carton is moving. As shown in FIGS. 15A and 15B, one or more sensors (e.g., photo-electric eyes 214a-b) may be used, either alone or together with a belt tick monitor or the like, to track the precise position of the egg package 204 with respect to the egg orienter 112.

Figure 19A:
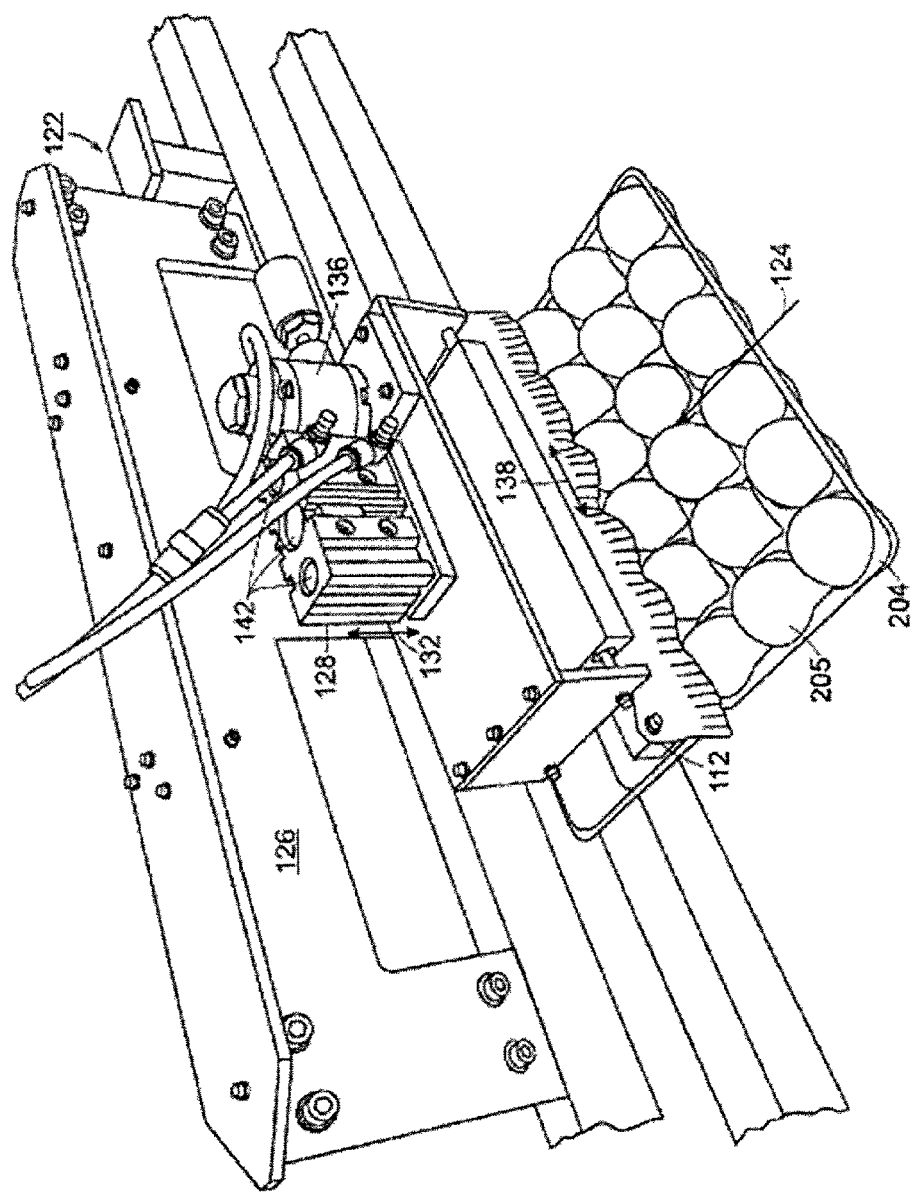
FIGS. 19A and 19B show perspective views of the two sides of a driving mechanism that may be used to move the egg orienter of FIG. 16 in a desired manner.
Figure 19B:
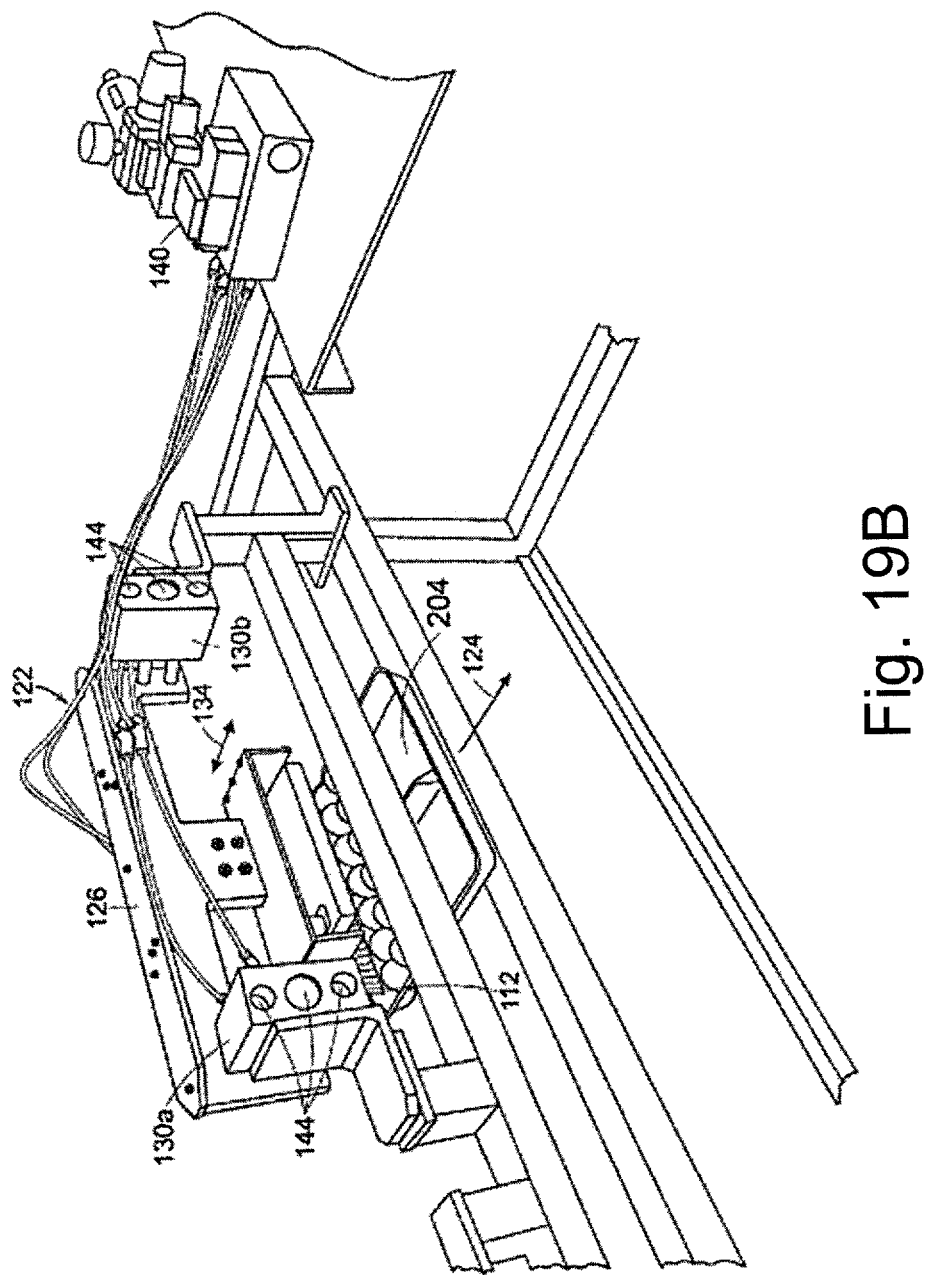

An example of a driving mechanism 122 that may be used to move the egg orienter 112 in a desired manner (e.g., as indicated by the arrows 113, 115 in FIGS. 15A and 15B) is shown in FIGS. 19A and 19B. The driving mechanism 122 may, for example, straddle the conveyor 202 at the location B (see FIGS. 15A-15B) so that packages of eggs pass underneath the egg orienter 112 in a direction indicated by the arrow 124 in FIGS. 19A-19B. As shown, the driving mechanism 122 may comprise a frame 126 that supports several double-acting pneumatic cylinders 128, 130a, 130b as well as a rotating pneumatic actuator 136. In the example shown, the pneumatic cylinder 128 and associated pistons 142 are responsible for moving the egg orienter 112 up and down (i.e., perpendicular to a plane of the conveyor 202) as indicated by the arrow 132 in FIG. 19A. Similarly, in the embodiment shown, the pair of pneumatic cylinders 130a and 130b and associated pistons 144 are responsible for moving the egg orienter 112 forward and backward over an egg package 204 (i.e., parallel to the direction of conveyor motion (see arrow 124)), as indicated by the arrow 134 in FIG. 19B. Also, in the embodiment shown, the rotating pneumatic actuator 136 is responsible for causing the egg orienter 112 to shimmy slightly from side to side as the egg orienter 112 is swept over the package 204 of eggs 205, as indicated by the arrow 138 in FIG. 19A.

As shown in FIG. 19B, the pneumatic components of the driving mechanism 122 may be connected to a compressor unit 140 (or other source of compressed air) that may be controlled so as to regulate the air flow to such components and thereby appropriately control their operation. Of course, embodiments that employ other types of actuators or motors (e.g., electric or hydraulic actuators or motors) may employ different types of control units to regulate movement of the egg orienter 112 in the desired manner.

As shown in FIG. 16, the egg orienter may comprise a frame 114 made of a suitable light-weight, sturdy material (e.g., aluminum) and a brush element 116 for sweeping across the tops of the eggs 205 in the package 204 to reorient them into the desired position. The brush element 116 may, for example, comprise a set of flexible but resilient fingers made of a suitable food-grade plastic, rubber, or other material. In the example shown, the brush element 116 is fastened to the frame 114 using a scallop-shaped aluminum member 118 to impart to the brush element 116 a corresponding scallop shape. Shaping the brush element 116 in this way allows nooks of the scallop shape to appropriately position the eggs 205 into the desired left-to-right position within the package 204.

In the embodiment shown, the egg orienter 112 further includes a set of tubes 120 disposed between nooks of the scallop-shaped aluminum member 118 and the frame 114. As shown, the tubes 120 may be arranged such that a pair of them straddles each egg 205 as the egg orienter 112 is swept across the tops of the eggs 205 in the package 204. Advantageously, a high-velocity air source (not shown) may be connected to the tubes 120 such that air may be blown onto and around the eggs 205 as the egg orienter 112 sweeps over the eggs 205 to reposition them. Blowing air over and around the eggs in such a fashion can help dry the surface of the eggs 205 uniformly prior to laser marking them and may also help overcome the friction between the bottoms of the eggs 205 and the package receptacles by creating a slight cushion of air between them.

In the illustrative embodiment shown, after the egg orienter 112 has repositioned the eggs 205 within the package 204, the conveyor 202 moves the package 204 to a location C at which a laser marking operation may be performed. FIGS. 17A and 17B illustrate how a group of eggs 205 may be oriented within a package 204 when the package 204 reaches the location C (as well as when the eggs ultimately reach a store, an end consumer, or some other post-packing location). FIG. 17A is a side view and FIG. 17B is a front view of a package 204 in which the eggs have been so oriented.

As shown, as a result of the processing by the egg orienter 112, the eggs 205 may be arranged uniformly within the package 204, with each egg 205 being tilted slightly toward the back 228 of the package 204 (see FIG. 17A) so that a large portion 230 of its surface area is exposed to the galvo 110 responsible for marking on it. In some embodiments, for example, the egg orienter 112 may manipulate the eggs 205 such that a long axis 232 of each egg is tilted at least slightly toward the back 228 of the package. For example, in certain embodiments, the egg orienter 112 may manipulate the eggs such that a long axis of each egg is offset from vertical (with "vertical" being defined as a line 233 normal to a plane coincident with a bottom portion 236 of the package (which, in FIGS. 17A and 17B, is parallel to the surface of the conveyor 202)) by an angle Θ that is a minimum of 3 degrees. In other embodiments, each of the eggs 205 in the each carton 204 may be offset from vertical by a minimum angle Θ, typically from 1 to about 22 degrees, or greater. In some embodiments, the egg orienter 112 can manipulate the eggs 205 so that such angle Θ for each egg is approximately 10 degrees, or some other suitable angle that maximizes the surface area that is made available to the laser marking apparatus for writing.

As shown in FIG. 17B, the egg orienter 112 may additionally orient the eggs 205 so that the long axes 232 of all of the eggs in each row of six eggs form approximate right angles with respect to a line intercepting the bottoms of the receptacles holding the eggs in such a row. In some implementations, the long axes 232 of all of the eggs in a given package may be oriented such that each such long axis 232 is no more than about 20 degrees (or, in some embodiments, no more than about 25 degrees, or no more than about 24 degrees, or no more than about 23 degrees, or no more than about 22 degrees, or no more than about 21 degrees, or no more than about 19 degrees, or no more than about 18 degrees, or no more than about 17 degrees, or no more than about 16 degrees, or no more than about 15 degrees, or no more than about 14 degrees, or no more than about 13 degrees, or no more than about 12 degrees, or no more than about 11 degrees, or no more than about 10 degrees, or no more than about 9 degrees, or no more than about 8 degrees, or no more than about 7 degrees, or no more than about 6 degrees, or no more than about 5 degrees, or no more than about 4 degrees, or no more than about 3 degrees, or no more than about 2 degrees, or no more than about 1 degree) offset from any other such long axis.

Figure 18:
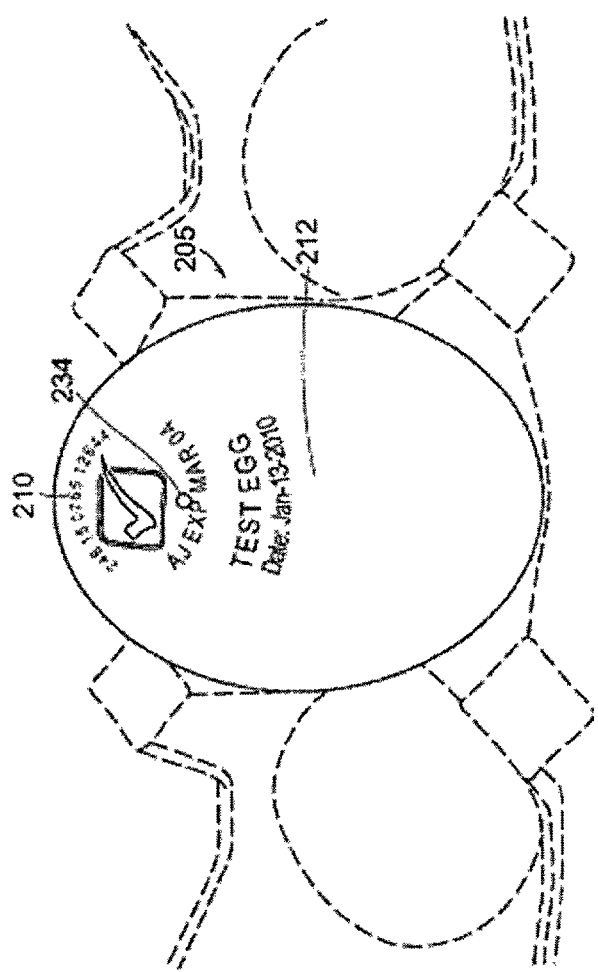
FIG. 18 is an illustration of a front view of an egg as it may appear when marked using one or more the techniques described herein.

When the eggs 205 are oriented within the package 204 in such a manner, the surface of the egg 205 that is immediately apparent to someone opening the package is neither an end nor the middle of the egg 205, but rather a section of the egg somewhere between those two locations. FIG. 18 shows an example of an egg 205 having laser marking on it. As shown, a point 234 in the center of the marking (also shown in FIGS. 17A and 17B) may be located between an end 210 and the middle 212 (i.e., the area located mid-way between the egg's two ends) of the egg 205. In some embodiments, the information marked on the egg may extend from the end 210 of the egg (or beyond) to the middle 212 of the egg (or beyond). As shown in FIG. 18, the information may be marked on the egg so as to extend horizontally with respect to the egg's long axis. In some embodiments, information may additionally or alternatively be marked so as to extend vertically generally in a direction of the egg's long axis. In some embodiments, the information laser marked on each egg may comprise one or more of a traceability code (uniquely identifying a specific egg or relatively small group of eggs—e.g., a carton), a company's logo and/or other advertising, an expiration date, grading information, and packing codes (e.g., a state code, a county code, a packer code and/or a Julian date). The eggs in a carton may be marked with as little or as much information in common as is desired. Thus, a message can, in fact, be piece-wise printed across multiple eggs.

In some embodiments, eggs may be oriented in each package and information may be marked on the eggs in such a way that the information marked on all of the eggs in each package can be viewed immediately upon opening the package, without requiring a human being to manipulate any of the eggs to allow such information to be viewed.

It is known that a significant percentage the eggs that are produced have the salmonella virus on them. For this and other reasons, various regulations exist governing when and how eggs may be manipulated. Allowing inspection of laser marked information on all of the eggs in a given package without needing to manipulate any of the eggs in the package can thus provide significant advantages.

Turning to FIGS. 20A and 20B, there is shown an example of an egg marking system 300 employing the concepts disclosed herein in connection with both a laser marking station 302 and an ink marking station 304. One can either dispose an ink jet printing station 304 upstream of (i.e., before) a laser printing station 302 as in FIG. 20A or downstream of a laser printing station (not illustrated). It is contemplated that when ink jet printing is employed, one or more ink jets will be provided per egg being marked, and that all eggs in a row of a carton may be marked before a next row is marked; concurrent marking of multiple rows is also possible, of course, with appropriately positioned print heads. Thus, while FIG. 20A shows just one ink head 306, more typically a group of print heads will be grouped (i.e., ganged) together to mark a row or group of eggs. The required ink reservoir(s) can supply ink to the ink heads via conduits 308, or the ink reservoirs can be incorporated into cartridges integrated with the print heads or mounted on an apparatus that moves with the print heads.

An orienter 310 as described herein may be used to position the eggs in the package before printing is performed, so that eggs do not shift position very much between the two printing stations. In this embodiment of an orienter, a series of resilient or sweeping members 311, depending from a support structure, urge the eggs into a tilted backward orientation. Thus, the desired relative printing positions for the two stations can be achieved without requiring complicated registration mechanisms.

The above-described package conveying and egg printing arrangements may be modified in various respects. Among them is an arrangement, shown schematically in FIG. 20A (leaving out as much detail as possible), wherein gravity can be used to assist in orienting the eggs as desired and in maintaining the orientation thereafter. A grading and packing system 320 drops eggs 322 into egg cartons or packages 324 as they pass on a conveyor 326, with the hinged lids 328 of the cartons arranged toward the downstream (in this drawing, leftward) end of conveyor 326. When each carton reaches the end of conveyor 326, the conveyor deposits the carton onto a rotatable tray 330. The tray 330 then is rotated 180 degrees, moving the carton 324 from position A to position B, wherein the hinged lid is now arranged toward the upstream end of conveyor 326. The carton is then transferred to an upwardly slanted conveyor 334. Various mechanisms can be employed to transfer the carton from the rotating tray to the downstream conveyor 334. For example, a portion of the tray may include a small conveyor mechanism. Alternatively, a supplementary mechanism can be used to effectuate the transfer, such as a pivoted pusher blade and appropriate driving apparatus (e.g., a hydraulic cylinder or solenoid), or any other desired mechanism. Likewise, a mechanism other that a rotating tray can be used to reverse the directions of the packages and if the grader/packer supplying the eggs in cartons delivers packages with the lids open and upstream of the bottom of the package containing eggs, a reversing mechanism is unnecessary.

An orienter station 310 may then operate upon the eggs in the carton to achieve the above-described orientation. From the orienter, conveyor 334 carries the egg carton to an ink jet printing station 304, if used, and thereafter into a lasing station 302. (Or to a lasing stating first and then to an ink printing station. There are advantages and disadvantages to both sequences. Moreover, each of the printing stations may be considered optional as printing may be limited to only laser printing or only ink printing, in some embodiments.) At the output of the lasing station, a closer mechanism 344 pivots the lid 328 to close the carton. The conveyor 334 may discharge the closed egg cartons onto a flat surface which is stationary, or onto another conveyor, from which the cartons may be removed and packed into boxes or crates.

The lasing station may include a housing 312 in which a non-volatile environment is maintained by appropriate apparatus, not shown. The laser devices may be contained within housing 312 or be external to that housing, with the laser beams conducted into the housing 312 via an enclosed path to which the ink volatiles are excluded.

Once the eggs are tilted backwardly in the cartons by the orienter, the upward slant of conveyor 334 provides an additional force urging the eggs to stay tilted back even while the conveyor jostles the packages. This approach is particularly helpful with respect to small eggs, and when the stopping and starting of the conveyor imparts enough force to overcome the friction between an egg and the carton. On a horizontal surface, such an egg might fall forward in the carton, out of aligned orientation.

The type of embodiment shown in FIGS. 20A, 20B can be used with the majority of existing egg grading systems as it is merely added on to the output of the grading. It is substantially a "one size fits all" approach.

The egg orienting operation is not limited to the above-discussed embodiment, but also may be performed by alternative apparatus. It may also be noted that it may be desirable to break the operation into two stages: (1) to orient, loosen and tilt the eggs and (2) to straighten the eggs from side to side. One apparatus can perform both operations or separate apparatus can be used for each.

If the eggs are on the small side, which is common, and the conveyor is horizontal or only tilted a small amount, then as the carton is moved from one location into the next location (which may be the next station or just the next row or next carton printing position) gravity and friction may not be enough to hold the eggs in their rest orientation; they can jostle or even fall forward as the conveyor chain stops suddenly. Optionally, therefore, there may be included in some embodiments of the orienter apparatus, with or without the above-described embodiment, two semi-flexible (resilient) rods 352, 354 (FIG. 21), which may be brought down on either side of the egg (by a suitable mechanism) and rotated about their axes so as to tend to straighten the eggs from side-to-side and also to push the egg backward as the rods are moved backward (i.e., in the direction B) over the carton. These rods can be made small enough in diameter to not be in the way of the printing process (or moved out of the way before the printing operation) and flexible enough to not damage the egg.

In another type of embodiment, the suspended resilient members of the orienter may comprise a plurality of suspended brushes or weighty, flat textile strips hanging down from a frame which drags them against the eggs in a motion similar to that employed in the above-described embodiment, to urge the eggs into the desired parallel, tilted positioning.

The orienter mechanism and process have been shown as applied to eggs, but it should be appreciated that it may be desirable to perform a similar operation on other objects, whether printing on them or not. For example, one might desire to orient other food objects similarly for packaging and/or labeling. These food objects might include produce such as apples and pears or bell peppers or any of a number of other fruits or vegetables. They might also include manufactured food products such as chocolates and candies that the manufacturer wishes to place uniformly into packages, or non-food products such as Christmas tree ornaments.

An egg container may include a number of other features that may be incorporated in combination with aspects described herein. An egg container may include any number of receptacles. For example, an egg container can be provided as a 36-pack, 30-pack, 20-pack, 18-pack, 12-pack, 8-pack or 6-pack. Some egg containers are slightly larger in dimensions so as to accommodate jumbo or extra-large sized eggs.

In addition to various guidance features such as railing elements or protrusions, the receptacle compartment within which the egg may sit may include grooves, for example, disposed in the corners or sides of the receptacles. Such grooves may allow for some degree of expansion of the compartment, for example, when an oversized egg is placed in the receptacle compartment and the external dimensions of the container are to be maintained. Grooves may also allow for more air circulation than railing elements alone in the space around the egg, which can be beneficial when eggs are subject to condensation on the surface or are heated and left to cool.

Egg containers may include tall sharp ridges disposed between the receptacle compartments. Such ridges may serve to prevent eggs from touching one another, particularly when eggs are dropped into compartments during the packing process and also during shipping.

The bottom of each receptacle external to the compartment may include a slight indent (off the bottom plane of the carton) which may provide a cushioning gap underneath the compartment, allowing the bottom of the compartment to flex when eggs are dropped during packing. Such an indent from the external side may also provide some level of flexibility and protection at the base of the receptacle during shipping and handling. Additionally and alternatively, a slight bump (protrusion) may be formed in the interior of the bottom of the compartment, to raise a smaller egg within the compartment and position it for the best height for the marking operation. Such a bump may be located, for example, around the expected axis of the tilted egg.

Egg containers may include a number of features at the edges of the receptacles. For example, stiffener ribs may be located at the ends of the containers so as to provide stiffness against excessive flexing of the container. Edges of the receptacles may also be uneven in height so as to provide cushioning for the container to be compressed. Uneven edges along receptacles of the container may provide space where fingers (e.g., de-nester fingers) may enter into so as to be helpful to assist in removing nested containers from one another. Similarly, the lid of the container may include a slight gap for a finger to be inserted so that the container may be easily opened. Additionally, edges between receptacles may provide air ventilation when the container is closed or slightly compressed.

The upper portion of a container may include a lid having substantially flat faces so that useful information may be printed thereon. For example, FIGS. 1A-2A show upper portions 20, 22 that include substantial flat space where any information may be provided, such as a label with the UPC barcode or advertising/marketing information.

The container may include a lid having retaining holes that permit the container to remain in a closed configuration. The portion of the lid surrounding the retaining holes may be reinforced with an added amount of thickness in material on the lower side of the lid so as to provide strength for mitigating the possibility for the lid to tear through the retaining hole.

A lid of the container may include a stabilizer bar extending down toward the lower portion of the container for substantially preventing collapse of the container when a weight is applied on top of the container. In some cases, edges or corners of the receptacles may have a height that reaches up so as to come into contact with the stabilizer bar. Accordingly, edges or corners of the receptacle that match the geometry of the stabilizing bar may provide support between the upper and lower portions of the container so as to prevent crushing of the eggs held within the container.

The container may include a tucker flap having a score line so that the tucker flap can be folded and positioned in the space between the eggs and the lid. The tucker flap may provide for added protection of the eggs situated in the receptacles of the container. The score line of the tucker flap may provide for consistent and easy closing of the container. In addition, a ridge along the length of the tucker flap may provide a barrier that stops the lid when the container is being closed, further preventing crushing of the eggs. In addition, the interior of the tucker flap may include one or more thinned regions that provide clearance for the eggs when the container is being closed and when closed.

To provide for easy, cost-effective shipping and storage of empty containers, containers may be constructed to nest with one another. For example, ridges located between receptacles may support nesting. In some cases, egg cartons nest at a spacing of approximately 0.3 inches between one another. During nesting, the container may include lug features disposed at various locations around the exterior of the container, which act as spacers to prevent over-compression of nested containers and for maintaining a desired separation when containers are stacked.

Having thus described certain embodiments of systems and methods for practicing aspects of this invention, it is to be appreciated that various alterations, modifications, and improvements will readily occur to those skilled in the art. Such alterations, modifications, and improvements are intended to be part of this disclosure, and are intended to be within the spirit and scope of the invention. For example, in embodiments wherein open egg packages are fed in the opposite direction onto the conveyor 202 shown in FIGS. 15A and 15B, i.e., such that the receptacle section leads the lid section, the loop-wise movement of the egg orienter 112 may be unnecessary, as the appropriate orientation of the eggs within the package 204 could be achieved simply by allowing the open packages of eggs to pass underneath the egg orienter 112 (if it is used, with or without causing it so shimmy slightly from side-to-side to help overcome friction). In such embodiments, because the tops of the eggs 205 would be caused to be tilted slightly to the right (as depicted in FIG. 15B), it would also be desirable to orient the galvos 110 so that they face slightly toward the back of the conveyor 202, thus allowing them to mark onto the large exposed surface area 230 of the eggs 205 obtained using this alternative technique, as illustrated in FIGS. 17A and 17B. Accordingly, the foregoing description and drawings are by way of example only.

What is claimed is:

1. A method for arranging eggs in a container, the method comprising acts of:

placing a first egg within a first receptacle of the container, the first receptacle being contoured such that the first egg comes to rest in a first resting orientation with a long axis of the first egg tilted toward a rear portion of the container;

placing a second egg within a second receptacle of the container, the second receptacle being contoured such that the second egg comes to rest in a second resting orientation with a long axis of the second egg tilted toward the first egg and toward the rear portion of the container;

mechanically adjusting the first and second eggs to assume the respective first and second resting orientations by contacting the first and second eggs with an egg orienter; and resisting movement of the first egg from the first resting orientation and the second egg from the second resting orientation such that the long axes of the first and second eggs remain substantially parallel to one another.

2. The method of claim 1, wherein resisting movement comprises employing the container, wherein the container incorporates into the receptacles or a lid, or both, features that apply friction to portions of the surfaces of the eggs to resist twisting of the eggs.

3. The method of claim 1, wherein the egg orienter comprises a plurality of resilient members configured and arranged to be moved relative to an egg in the package so as to urge the egg to its respective resting orientation.

4. The method of any one of claims 1, 2, and 3, wherein each receptacle is constructed and arranged to hold an egg within a compartment of the receptacle so that the egg is substantially maintained in a resting orientation where a long axis of the egg is tilted toward a rear portion of the container.

5. The method of claim 4, wherein the compartment is asymmetrically contoured with respect to the vertical axis, to establish a tilted resting orientation for an egg.

6. The method of claim 1, wherein each receptacle is constructed and arranged to hold an egg within a compartment of the receptacle, and wherein a long axis of the compartment is tilted toward the rear portion of the container.

7. The method of claim 1, wherein each receptacle includes at least one guidance feature adapted to guide the egg upon entry into a compartment of the receptacle to reach the resting orientation.

8. The method of claim 1, wherein each receptacle is constructed and arranged to hold an egg within a compartment of the receptacle, and wherein the method further comprises closing a lid of the container and thereby covering the compartment of each receptacle, the lid comprising a stabilizing feature adapted to gently hold the egg in the resting orientation without breaking an egg.

9. The method of claim 8, wherein the stabilizing feature comprises for each receptacle one or more depending members positioned and dimensioned to bear lightly upon the surface of an egg in the receptacle.

10. The method of claim 8, wherein the stabilizing feature is constructed and arranged to contact the egg at a region distal from that where at least one guidance feature is constructed and arranged to contact the egg.

11. A method for arranging eggs in a container, the method comprising acts of:

placing a first egg within a first receptacle of the container, the first receptacle being contoured such that the first egg comes to rest in a first resting orientation with a long axis of the first egg tilted toward a rear portion of the container;

placing a second egg within a second receptacle of the container, the second receptacle being contoured such that the second egg comes to rest in a second resting orientation with a long axis of the second egg tilted toward the first egg and toward the rear portion of the container; and resisting movement of the first egg from the first resting orientation and the second egg from the second resting orientation such that the long axes of the first and second eggs remain substantially parallel to one another, wherein:

each receptacle includes at least one guidance feature adapted to guide the egg upon entry into a compartment of the receptacle to reach the resting orientation; and the at least one guidance feature comprises at least one railing element having a flexible surface and configured to guide a lower end of the egg toward a front portion of the receptacle and into the resting orientation.

12. The method of claim 11, wherein the compartment is asymmetrically contoured with respect to the vertical axis, to establish a tilted resting orientation for an egg.

13. The method of claim 11, wherein a long axis of the compartment is tilted toward the rear portion of the container.

14. The method of claim 11, wherein the method further comprises closing a lid of the container and thereby covering the compartment of each receptacle, the lid comprising a stabilizing feature adapted to gently hold the egg in the resting orientation without breaking an egg.

15. The method of claim 14, wherein the stabilizing feature comprises for each receptacle one or more depending members positioned and dimensioned to bear lightly upon the surface of an egg in the receptacle.

16. The method of claim 14, wherein the stabilizing feature is constructed and arranged to contact the egg at a region distal from that where at least one guidance feature is constructed and arranged to contact the egg.

17. A method for arranging eggs in a container, the method comprising acts of:

placing a first egg within a first receptacle of the container, the first receptacle being contoured such that the first egg comes to rest in a first resting orientation with a long axis of the first egg tilted toward a rear portion of the container;

placing a second egg within a second receptacle of the container, the second receptacle being contoured such that the second egg comes to rest in a second resting orientation with a long axis of the second egg tilted toward the first egg and toward the rear portion of the container; and resisting movement of the first egg from the first resting orientation and the second egg from the second resting orientation such that the long axes of the first and second eggs remain substantially parallel to one another, wherein:

each receptacle includes at least one guidance feature adapted to guide the egg upon entry into a compartment of the receptacle to reach the resting orientation; and the at least one guidance feature comprises at least one protrusion having a flexible surface providing sufficient friction based on a weight of the egg and surface contact area of the at least one protrusion with the egg so as to substantially resist movement of the egg from the resting orientation.

18. The method of claim 17, wherein the compartment is asymmetrically contoured with respect to the vertical axis, to establish a tilted resting orientation for an egg.

19. The method of claim 17, wherein a long axis of the compartment is tilted toward the rear portion of the container.

20. The method of claim 17, wherein the method further comprises closing a lid of the container and thereby covering the compartment of each receptacle, the lid comprising a stabilizing feature adapted to gently hold the egg in the resting orientation without breaking an egg.

21. The method of claim 20, wherein the stabilizing feature comprises for each receptacle one or more depending members positioned and dimensioned to bear lightly upon the surface of an egg in the receptacle.

22. The method of claim 20, wherein the stabilizing feature is constructed and arranged to contact the egg at a region distal from that where at least one guidance feature is constructed and arranged to contact the egg.

* * * * *